US009507367B2

United States Patent
Venayagamoorthy et al.

(10) Patent No.: US 9,507,367 B2
(45) Date of Patent: Nov. 29, 2016

(54) METHOD AND SYSTEM FOR DYNAMIC STOCHASTIC OPTIMAL ELECTRIC POWER FLOW CONTROL

(71) Applicants: Ganesh Kumar Venayagamoorthy, Clemson, SC (US); Jiaqi Liang, Cary, NC (US); Ronald Gordon Harley, Lawrenceville, GA (US)

(72) Inventors: Ganesh Kumar Venayagamoorthy, Clemson, SC (US); Jiaqi Liang, Cary, NC (US); Ronald Gordon Harley, Lawrenceville, GA (US)

(73) Assignees: Clemson University, Clemson, SC (US); Georgia Tech Research Corporation, Atlanta, GA (US); The Curators of the University of Missouri, Columbia, MO (US)

( * ) Notice: Subject to any disclaimer, the term of this patent is extended or adjusted under 35 U.S.C. 154(b) by 645 days.

(21) Appl. No.: 13/859,242

(22) Filed: Apr. 9, 2013

(65) Prior Publication Data

US 2013/0268131 A1 Oct. 10, 2013

Related U.S. Application Data

(60) Provisional application No. 61/621,654, filed on Apr. 9, 2012.

(51) Int. Cl.
*G05F 5/00* (2006.01)
*H02J 3/16* (2006.01)

(52) U.S. Cl.
CPC .. *G05F 5/00* (2013.01); *H02J 3/16* (2013.01)

(58) Field of Classification Search
None
See application file for complete search history.

(56) References Cited

U.S. PATENT DOCUMENTS

| 5,517,422 | A * | 5/1996 | Ilic | H02J 3/06 307/57 |
| 6,625,520 | B1 * | 9/2003 | Chen | H02J 3/00 700/286 |
| 8,930,034 | B1 * | 1/2015 | Wilson | H02J 3/00 700/286 |
| 2001/0021896 | A1 * | 9/2001 | Bertsch | H02J 3/24 702/62 |
| 2004/0158417 | A1 * | 8/2004 | Bonet | H02J 3/00 702/57 |
| 2007/0250217 | A1 * | 10/2007 | Yoon | H02J 3/1814 700/286 |
| 2012/0179301 | A1 * | 7/2012 | Aivaliotis | H02J 3/00 700/286 |
| 2013/0106196 | A1 * | 5/2013 | Johnson | H02J 3/1842 307/82 |

(Continued)

OTHER PUBLICATIONS

Momoh, J.; Si, J.; Barto, A.; Powell, W.; Wunsch, D., "Toward Dynamic Stochastic Optimal Power Flow," in Handbook of Learning and Approximate Dynamic Programming, 1, Wiley-IEEE Press, 2004, pp. 561-598.*

(Continued)

*Primary Examiner* — Christopher E Everett
(74) *Attorney, Agent, or Firm* — John R. Perkins, Jr.; Perkins Law Firm, LLC

(57) ABSTRACT

A dynamic stochastic optimal power flow (DSOPF) control system is described for performing multi-objective optimal control capability in complex electrical power systems. The DSOPF system and method replaces the traditional adaptive critic designs (ACDs) and secondary voltage control, and provides a coordinated AC power flow control solution to the smart grid operation in an environment with high short-term uncertainty and variability. The DSOPF system and method is used to provide nonlinear optimal control, where the control objective is explicitly formulated to incorporate power system economy, stability and security considerations. The system and method dynamically drives a power system to its optimal operating point by continuously adjusting the steady-state set points sent by a traditional optimal power flow algorithm.

16 Claims, 22 Drawing Sheets

(56) References Cited

U.S. PATENT DOCUMENTS

2013/0226358 A1* 8/2013 Rudkevich ............... H02J 3/06
   700/286
2014/0032187 A1* 1/2014 Legbedji .............. G05B 13/042
   703/2

OTHER PUBLICATIONS

Momoh, J.A., "Smart grid design for efficient and flexible power networks operation and control," in Power Systems Conference and Exposition, 2009. PSCE '09. IEEE/PES , pp. 1-8, Mar. 15-18, 2009.*

Momoh, J.A., "Optimal Methods for Power System Operation and Management," in Power Systems Conference and Exposition, 2006. PSCE '06. 2006 IEEE PES , pp. 179-187, Oct. 29, 2006-Nov. 1, 2006.*

Anderson, R.N.; Boulanger, A.; Powell, W.B.; Scott, W., "Adaptive Stochastic Control for the Smart Grid," in Proceedings of the IEEE , vol. 99, No. 6, pp. 1098-1115, Jun. 2011.*

Liang, Jiaqi; Harley, Ronald G.; Venayagamoorthy, Ganesh K.; "Adaptive Critic Design Based Dynamic Optimal Power Flow Controller for a Smart Grid"; 2011.

Liang, Jiaqi; Venayagamoorthy, Ganesh K.; Harley, Ronald G.; "Wide-Area Measurement Based Dynamic Stochastic Optimal Power Flow Control for Smart Grids With High Variability and Uncertainty"; IEEE Transactions on Smart Grid, vol. 3, No. 1, Mar. 2012.

Liang, Jiaqi; Molina; Diogenes D.;; Venayagamoorthy, Ganesh K.; Harley, Ronald G.; "Two-Level Dynamic Stochastic Optimal Power Flow Control for Power Systems With Intermittent Renewable Generation"; IEEE Transactions on Power Systems; 2013.

B. Fardanesh; Future Trends in Power System Control; IEEE Computer Applications in Power; pp. 24-31; Jul. 2002.

* cited by examiner

METHOD AND SYSTEM FOR DYNAMIC STOCHASTIC OPTIMAL ELECTRIC POWER FLOW CONTROL

CROSS-REFERENCE TO RELATED APPLICATIONS

This application claims priority to U.S. Provisional Appl. No. 61/621,654 filed Apr. 9, 2012, which is incorporated herein by reference.

STATEMENT OF GOVERNMENT SUPPORT

This invention was made with government support under grants #1238097, 1231820 and 0802047, awarded by The National Science Foundation. The U.S. Government has certain rights in this invention.

FIELD OF THE INVENTION

The present invention generally relates to electrical power control systems and, more particularly, to a dynamic stochastic optimal power flow (DSOPF) control system that provides multi-objective optimal control capability to complex electrical power systems. The DSOPF control may be implemented using nonlinear optimal control techniques, including but not limited to adaptive critic designs and the model predictive control method. The invention provides a coordinated secondary AC power flow control solution to electrical power systems with high penetration of intermittent renewable energy generation.

BACKGROUND OF THE INVENTION

The United States electrical power supply system consists of multiple electrical power generation stations and electrical power users (loads) all connected to an electrical power system generally referred to as the "grid." Control of that system is typically provided by manual and automated systems within a group of electrical power providers, each of which in the United States is generally called an Electrical Utility or Co-Op. These power control systems offer many advantages and disadvantages.

With the increasing penetration of intermittent renewable energy, power systems encounter more and more uncertainty and variability. How to reliably and efficiently operate a power system in such an environment is still an unanswered challenging question. With state-of-the-art wind forecasting methods, the hour-ahead forecast errors for a single wind plant are still around 10%-15% with respect to its actual outputs. With much lower forecasting errors for loads, the traditional power system operation is based on deterministic security-constrained commitment and dispatch processes, which tend to be conservative (using forecasts with a high probability of exceedance) when intermittent renewable generation is considered. This conservative operation contributes to a large amount of wind curtailment, as secure operation cannot be guaranteed in real time when the actual wind power significantly exceeds the forecasts used in the scheduling and dispatching processes.

The optimal power flow (OPF), or its security-constrained version, is based on steady-state optimization without considering local controller and load dynamics, and its optimal solutions are obtained based on forecasts. With uncertainty from renewable generation and storage, the convexity of the OPF problem is often the subject of research. Although the OPF provides optimal dispatches for the next forecasted period, any unforeseen real-time load/generation variation or post-contingency operation between two dispatch instants (typically 5 minutes apart) are handled by simple linear controllers or some predefined reactions with little, if any, system-wide optimization. For real-time active power balancing, the proportional-integral-controller-based automatic generation control (AGC) is typically used. For reactive power support, locally-controlled reactive resources are typically used for voltage regulation, such as large generators equipped with automatic voltage regulators (AVRs), switched capacitor banks, on-load tap changing (OLTC) transformers, and flexible AC transmission system (FACTS) devices. Moreover, the variety of active power generation controllers and reactive power generation controllers is quite broad so that a power control system can output control data to a vast array of devices and systems to vary the amount of active and reactive power within a power system.

The development of wide-area measurement systems (WAMSs), based on synchronized phasor measurement units (PMUs), greatly improves the power grid observability, even during transient events. WAMSs enable distributed dynamic state estimation, which can dramatically reduce the reporting time of the global system states (from minutes down to fractions of a second) and improve the grid visibility from steady states to dynamic behaviors. With the global dynamic information, advanced wide-area control (WAC) schemes become possible to improve grid dynamics. Most of the WAC schemes to date have focused on power system stability related issues, including the transient/small-signal stabilizing control to mitigate angle instability, and the secondary voltage control to mitigate voltage instability. The design of a system-wide automatic power flow controller to dynamically control a power system to its optimal operating point has received little attention.

B. Fardanesh described an ideal control scenario for power systems, where the optimal operating condition was achieved continuously by some closed-loop control algorithms, but he did not describe how to design such a control algorithm. See B. Fardanesh, "Future Trends in Power System Control," *IEEE Comput. Appl. Power*, vol. 15, no. 3, pp. 24-31, July 2002. Conceptual frameworks for applying adaptive critic designs (ACDs) to power system optimizations, namely dynamic stochastic optimizations, have also been proposed. No one has yet described any detailed designs or analyses for a power system control, however, to incorporate prediction and optimization over power system stochastic disturbances.

Further to this point, existing power system active and reactive power control methods for the grid, including automatic generation control and regional voltage control, are based on linear proportional-integral controllers. These linear controllers cannot consider multiple control objectives and cannot ensure system security in real-time. To achieve a high penetration level of intermittent renewable energy (e.g., wind, photovoltaic, and solar thermal) generation, the control of power systems needs to account for the high short-term variability and uncertainty associated with these intermittent energy sources. Power system security needs to be ensured dynamically as the system operating condition continuously changes.

It is important to understand that generators inject different amounts of active and reactive power into the power system. FACTS devices generate reactive power, but can also regulate the flow of active and reactive power in the grid.

Moreover, the existing structure of power system operation and control is organized in three layers: the primary, secondary, and tertiary control layers respectively. The primary control consists of controls at the local generator and device levels, and has no visibility into the rest of the power system. The secondary control consists of controls for an area power network. These controls include automatic generation control (AGC) for regulating the system frequency, and the regional voltage control (RVC) for regulating voltages of certain buses within the area. The tertiary control layer, which is slower than the secondary control layer, is typically based on a steady-state OPF algorithm that minimizes the steady-state overall system operation cost of one or more areas. Lines that interconnect different areas are known as tie lines.

The tertiary control sends steady-state or set-point commands, which are obtained based on forecasts, to generators and FACTS devices typically every 5 minutes. Any unforeseen real-time load and/or generation variations or system topology changes due to grid contingencies need to be handled by the secondary controllers. The secondary controls react to disturbances in power systems and adjust the steady-state commands at intervals of 1 to 4 seconds.

For the secondary active power control, the system frequency and inter-area tie-line flows are regulated by the AGC, which is typically a simple proportional-integral (PI) controller. The AGC treats the grid as a single bus (or node) and does not consider system constraints (e.g., line loadings, bus voltages). For the secondary reactive power control, a power system is typically divided into separate voltage regulation regions with each region having its own pilot bus. The main generators in each region are used to regulate the voltage of the pilot bus by using a linear PI controller. No coordination between the secondary active and reactive power controls has been developed and reported in the prior art.

The existing linear secondary control schemes for frequency and voltage are based on the assumption that only small variations and uncertainties exist in power systems during a short period of time. With high penetration of intermittent renewable energy, significant power flow redistribution may occur in a short period of time. A more sophisticated coordinating control method is needed to ensure real-time system security.

What is needed is a dynamic stochastic optimal power flow (DSOPF) control system that provides multi-objective optimal control capability to complex electrical power systems. It would be beneficial if the DSOPF control may be implemented using nonlinear optimal control techniques, including but not limited to adaptive critic designs and the model predictive control method. Put in other terms, it would be beneficial if the system and method could provide a coordinated secondary AC power flow control solution to electrical power systems with high penetration of intermittent renewable energy generation.

An object of the present invention is to provide a dynamic stochastic optimal power flow (DSOPF) control scheme to provide multi-objective optimal control capability to complex electrical power systems.

A further object of the invention is to implement the DSOPF control using nonlinear optimal control techniques, including but not limited to adaptive critic designs and the model predictive control method.

Yet another object of the invention is to provide a coordinated secondary AC power flow control solution to electrical power systems with high penetration of intermittent renewable electrical energy generation.

SUMMARY OF THE INVENTION

The present invention accomplishes the foregoing objects by providing a dynamic stochastic optimal power flow (DSOPF) control scheme to provide multi-objective optimal control capability to complex power systems. A power system or network in this sense mean an electrical power system or network.

The invention further provides a DSOPF to replace traditional linear secondary control of existing power system controllers with a nonlinear optimal control for system-wide AC power flow.

The invention further provides implementation of the DSOPF control using nonlinear optimal control techniques, including but not limited to adaptive critic designs and the model predictive control method.

The present invention also provides a coordinated secondary AC power flow control solution to power systems with high penetration of intermittent renewable electrical energy generation.

Moreover, the invention provides an improved system and method for increasing stability of electrical power systems by monitoring the conditions within a power system using traditional power system sensors and PMUs, using the DSOPF system and method to predict future states within the power system and calculate a DSOPF model, then outputting control data to a variety of active power generation controllers and reactive power generation controllers to vary the amount of active and reactive power within a power system. The terms active power controller and reactive power controller are not limited to standard electrical controllers, but represent any means of controlling active power and reactive power in an electrical grid. The means used to control active power and reactive power generation is not, therefore, important because a person of ordinary skill understands that active and reactive power can be controlled within a grid in multiple ways.

In this manner, the advantages of the invention become apparent. The invention provides optimal coordinated secondary active and reactive power flow control. An analytical model of a power system is not necessary. Different performance indices and constraints of a power system can be formulated into the control objective. The invention handles power system dynamic and stochastic events by optimally and dynamically redistributing AC power flow. And the invention allows seamless integration of intermittent renewable generation resources. This will be of growing importance as the amount of energy generated from wind and solar keeps growing.

More specifically, the invention provides an electrical power system comprising: a multiplicity of sensors in communication with an electrical grid, wherein said sensors monitor conditions within said electrical grid and produce condition data corresponding to said conditions within said electrical grid; a dynamic stochastic optimal power flow (DSOPF) control system in communication with said multiplicity of sensors for receiving said condition data and generating control data; an active power generation controller in communication with said electrical grid and said DSOPF control system; a reactive power generation controller in communication with said electrical grid and said DSOPF control system; whereby said DSOPF control system calculates a DSOPF model representing an optimal power system state for said electrical grid based upon said condition data, then outputs control data to one or more of said active power generation controller and said reactive power generation controller to control the amount of active and reactive power in said electrical grid.

The system further provides a functional unit that is used to estimate the cost-to-go function as described by the equation $$J(k) = \sum_{i=0}^{\infty} \gamma^i \cdot U(k+i).$$

The DSOPF control system can be adapted based on the feedbacks from the critic network and the up-to-date model network.

The system further provides a functional unit used to estimate the cost-to-go function as described by (i) derivative(s) of J(k) with respect to state(s) of the system, and (ii) a combination of the scalar cost-to-go function, J(k), and derivative(s) of J(k) with respect to state(s) of the system.

In various embodiments of the invention the multiplicity of sensors comprise one or more of a line flow sensor, bus voltage sensor, generator rotor angle sensor, generator speed sensor, generator power output sensor, and a phasor measurement unit.

In other embodiments of the invention the active power generation controller and reactive power generation controller comprise one of a flexible alternating current transmission system (FACTS) device and an active power set-point for an individual generation input.

In various embodiments of the invention one of the area control error, system-wide voltage deviation, loading of system-wide heavily loaded power lines, curtailment of renewable energy generation, total fuel usage and cost, total line losses, and the control effort in said electrical grid is minimized. In other embodiments the system stability margin of said electrical grid is maximized.

The invention further provides a system for improved control of the active and reactive power flow in an electrical grid comprising: a computer readable medium in communication with a multiplicity of sensors connected to an electrical grid, wherein said multiplicity of sensors monitor conditions within said electrical grid and produce condition data corresponding to said conditions within said electrical grid; and a set of computer readable instructions embodied within said computer readable medium for receiving data to determine the present control state of said electrical grid, to create a dynamic stochastic optimal power flow (DSOPF) model representing an optimal power flow of said electrical grid in response to said condition data, and to implement said DSOPF model by controlling said electrical grid through output of control data to one or more active power generation controllers and reactive power generation controllers respectively capable of controlling the amount of active and reactive power in said electrical grid.

The invention further provides a method of improving the stability of an electrical grid, said method comprising the steps of: receiving condition data from a multiplicity of sensors in communication with an electrical grid, wherein said multiplicity of sensors monitor conditions within said electrical grid and produce condition data corresponding to said conditions within said electrical grid; inputting said condition data into a dynamic stochastic optimal power flow (DSOPF) control system; creating a DSOPF model for said electrical grid based upon said condition data; and generating control data corresponding to said DSOPF model to control one or more of an active power generation controller and a reactive power generation controller in communication with said electrical grid and said DSOPF control system, whereby the amount of active and reactive power in said electrical grid is controlled.

In other embodiments of this method, one or more of an active power generation controller and a reactive power generation controller in communication with said electrical grid and said DSOPF control system, whereby one or more of the area control error, system-wide voltage deviation, generator speed deviations, loading of system-wide heavily loaded power lines, curtailment of renewable energy generation, total fuel usage and cost, total line losses, and the control effort in said electrical grid is minimized. In further embodiments of this method, the system stability margin of said electrical grid is maximized.

DESCRIPTION OF THE DRAWINGS

The invention will be more readily understood with reference to the following specification in conjunction with the drawings herein.

DESCRIPTION OF THE PREFERRED EMBODIMENTS

Example 1

Method for Power System Secondary Control

Figure 1:
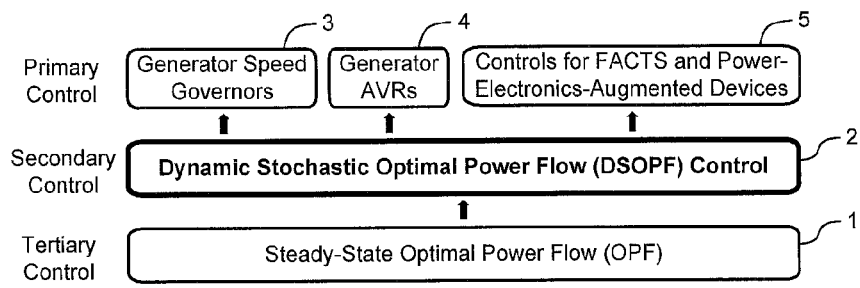
FIG. 1 is a graphical view of a dynamic stochastic optimal power flow (DSOPF) control structure for electrical power systems according to a preferred embodiment of the invention.

The invention includes many components and variations comprising multiple embodiments. One embodiment of the invention is a method of coordinating secondary control in a power system, namely the dynamic stochastic optimal power flow (DSOPF) control 2 as indicated in FIG. 1, which illustrates a new power system operation-control structure using a novel DSOPF control method. An existing optimal power flow (OPF) method 1 provides steady-state commands directly to local controllers, which include generator speed governors (GOV)s 3, generator automatic voltage regulators (AVRs) 4, and controls for FACTS and power-electronics-augmented devices 5. In contrast to the prior art OPF method, the DSOPF method 2 in the secondary control layer controls both the active and reactive power flows simultaneously to obtain an optimal real-time dynamic dispatch.

Figure 2:
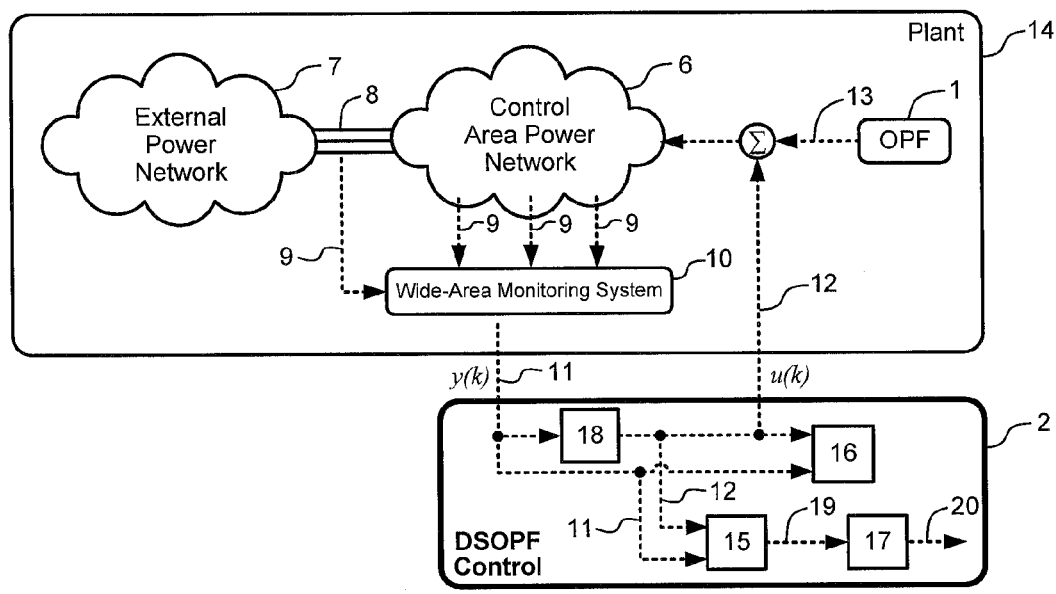
FIG. 2 is a graphical view of a generic framework of a DSOPF control structure for electrical power systems.

A generic framework of the DSOPF control 2 is illustrated in FIG. 2. The control area power network 6 is connected to an external power network 7 through tie lines 8. Wide-area measurements 9 of the control area power network 6 are collected and processed by a wide-area monitoring system 10. Feedbacks 11 are then transmitted from the wide-area monitoring system 10 to the DSOPF control 2. Based on the real-time conditions of the control area power network 6, the DSOPF controller generates control actions 12 to dynamically adjust the steady-state commands 13 generated by the OPF method 1.

Before discussing the design of the two-level DSOPF controller 2, it is important to understand the adaptive critic design (ACD) algorithm. The ACD technique provides the basis for implementing the DSOPF control. The ACD combines the concepts of reinforcement learning and approximate dynamic programming. This technique has been applied in areas including robotic control, missile control, flight control, as well as control applications in power systems.

The ACD technique uses a neural network, namely the critic network, to approximate the cost-to-go function J in the Bellman's equation of dynamic programming, in a step-by-step manner as follows:

$$J(k) = \sum_{i=0}^{\infty} \gamma^i \cdot U(k+i) \qquad \text{Equation 1}$$

where $\gamma$ ($0<\gamma<1$) is a discount factor, and U(k) is the utility function (a present cost to be minimized at time k). The optimal control problem is to generate control actions that minimize J(k) at each time step k.

The DSOPF control may therefore be implemented using nonlinear optimal control techniques. For nonlinear optimal control techniques such as the adaptive critic designs and model predictive control, a nonlinear system model 15, obtained by identification or analytical modeling, is typically used to predict the future responses 19 of the dynamic plant 14. A utility function, U(k) 16, is defined as the present cost of the system to be minimized. Based on the predicted responses 19 and the user-defined utility function 16, a cost-to-go function, J(k+1) 20, is estimated by 17. The cost-to-go function 20 is typically defined as the time accumulation of the utility function 16, as in Equation 1.

Other forms of Equation 1 are applicable such as derivatives and a combination of scalar and derivatives. The controller 18 is trained such that its control actions 12 minimize the cost-to-go function 20 or alternative forms as described by Venayagamoorthy. See "Comparison of heuristic dynamic programming and dual heuristic programming adaptive critics for neurocontrol of a turbogenerator", *IEEE Transactions on Neural Networks*, vol. 13, May 2002, pages 764-773.

Utility Function for a DSOPF Controller

The utility function 16 of FIG. 2 is a function of the plant outputs 11 and control actions 12. In the DSOPF control scheme, the utility function is formulated to describe the frequency deviation, tie-line flow deviations, bus-voltage deviations, line loadings, total energy cost, line losses, generator stability margins, and/or other indices related to the system economy, stability and security. For example, the utility function may include the following seven components: the area control error, $U_{ACE}(k)$; the system voltage deviation, $U_{Volt}(k)$; the system line loading, $U_{Line}(k)$; the total fuel cost, $U_{Fuel}(k)$; the wind curtailment, $U_{Wind}(k)$; the total line loss, $U_{Loss}(k)$; and the control effort, $U_{Ctrl}(k)$, as in $$U(k) = U_{ACE}(k) + U_{Volt}(k) + U_{Line}(k) + U_{Fuel}(k) + U_{Wind}(k) + U_{Loss}(k) + U_{Ctrl}(k) \quad \text{Equation 2}$$

In Equation 2, the weighting or level of importance of each term is taken to be the same. Different weightings can be given by using coefficients other than '1' on the right hand side term of Equation 2. The entire utility and sub-utilities can be customized to match the user requirements. Examples of sub-utilities are given with respect to Functions 2 and 8 in Example 2.

Figure 14A:
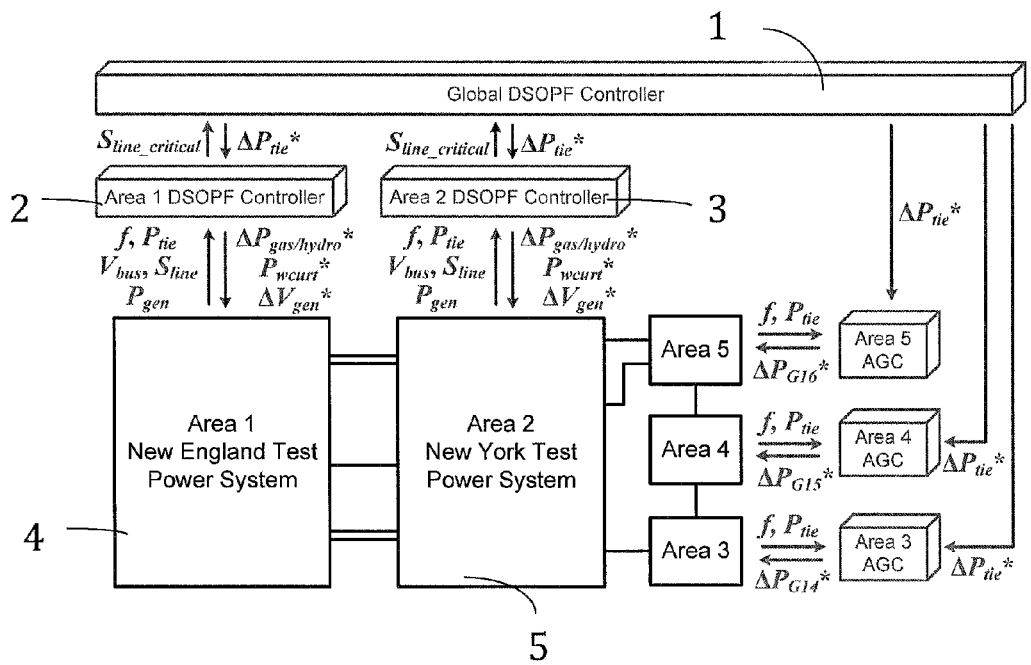
FIG. 14a is a graphical view of a global DSOPF system controlling multiple areas within an electrical grid.
Figure 14B:
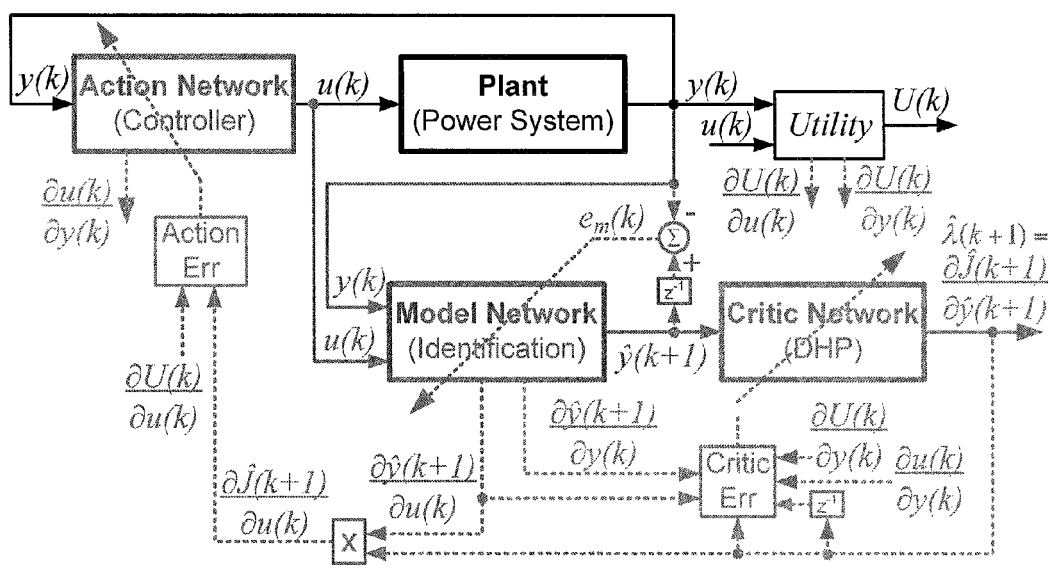
FIG. 14b is a graphical view of the control calculations within a global DSOPF system controlling multiple areas in an electrical grid.

FIG. 14b illustrates a schematic diagram of the dual heuristic dynamic programming (DHP) technique in the ACD family. In the DHP scheme, the critic network directly estimates $\lambda(k)$, the gradient of $J(k)$ with respect to the plant (power system) outputs. A model neural network is used to continuously identify the plant dynamics and provide a nonlinear differentiable plant model. An action neural network is trained to minimize Equation 1 and to approximate the optimal control laws. $y(k)$ denotes the plant output at time k, and $u(k)$ denotes the controller action. The various partial derivative signals are used for training the three neural networks.

Design Procedures of an ACD-Based DSOPF Controller

It is possible to design a DSOPF controller with the dual heuristic dynamic programming (DHP) ACD scheme. DHP is a class of adaptive critics where the derivatives of Equation 1 are used to provide feedback to the controller 18. Referring again to FIG. 2, in a DHP scheme, three neural networks, namely the model, critic, and action networks, may be used to implement the plant model 15, the partial derivative of $J(k+1)$ with respect to $y(k+1)$, estimator 17 (DHP critic), and the controller 18, respectively. Here, 17 represents the cost-to-go function. The design of such an ACD-based DSOPF controller consists of two major steps: (i) offline training of the model network, and (ii) online training of the critic and action networks.

Offline Training of the Model Network

Pseudo-random binary signals (PRBSs) may be injected through the control actions 12 into the plant over a wide operating range. The plant responses 11 and the injected PRBSs are recorded. Alternatively, ambient conditions may be used to obtain the same. The model network is trained offline to minimize the one-step-ahead prediction error over all the recorded data. After the offline training, the model network is used to provide system-wide cross-coupling sensitivity signals over a wide operating range.

Online Training of the Critic and Action Networks

The DHP critic network is trained online to approximate $\lambda(k+1)$, the partial derivative of $J(k+1)$ with respect to $y(k+1)$ 19, 20. The training of the critic network starts with a small discount factor, $\gamma$. As the critic weights converge, the discount factor is gradually increased.

The action network is trained to approximate the optimal control law by minimizing the partial derivative of $J(k)$ with respect to $u(k)$ 12. During the training, when this partial derivative becomes zero or close to zero, $u(k)$ is the optimal control action that minimizes $J(k)$ in the local region. Global optimization is obtained by exposing the action network to different system conditions.

When training the critic and action networks, the model weights are continuously updated with a small learning rate to ensure tracking of new operating conditions.

To minimize the initial impact on the plant, the random initial weights of both the critic and action networks are limited to small values such that the initial outputs of both the critic and action networks are close to zero.

Control Performance of an Example DSOPF Controller for a 12-Bus System

In one embodiment of the invention, the DSOPF control algorithm coordinates both active and reactive power for a power system. To illustrate the benefit of this DSOPF method, a 12-bus power system as illustrated in FIG. 3 is selected and the system dynamic performances from using the traditional linear controllers and the DSOPF controller are compared.

Figure 3A:
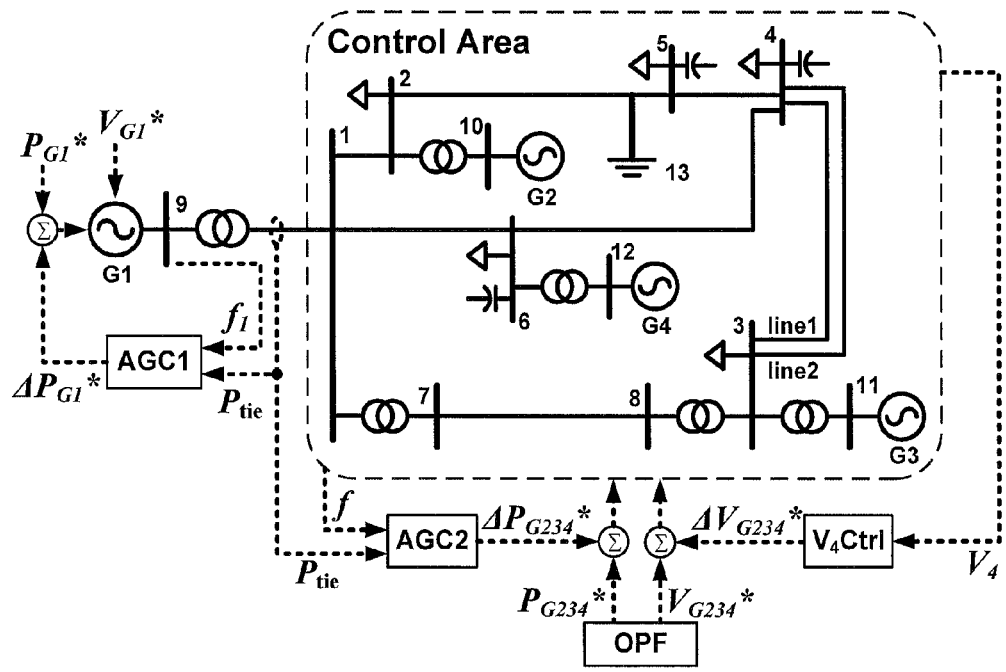
FIG. 3a is a graphical view of a 12-bus electrical power system using traditional linear controllers.

The control state of an electrical grid is normally monitored by electronic collection of data corresponding to the conditions in the electrical grid. This condition data is generally collected from a multiplicity of sensors connected to the electrical grid. Many of these data collection points are illustrated in FIG. 3a as they would be collected from the multiplicity of sensors in real-time or near real-time. In newer systems, phasor measurement units (PMUs) are also used to sense and collect condition data.

In FIG. 3a, the power system labels and variables are illustrated as follows: f is the system frequency; $P_{tie}$ is the tie-line active power flow; $V_4$ is the bus 4 voltage; $V_{buses}$ denotes bus voltages for all the load buses; $S_{lines}$ denotes line loadings for major transmission lines; $P_{gens}$ denote generation from G2, G3, and G4; $P_{loss}$ is the total system line loss; $P_{G234}{}^*$ and $V_{G234}{}^*$ are active power and terminal voltage commands for generators G2, G3, and G4, provided by the traditional OPF algorithm; and $\Delta P_{G234}{}^*$ and $\Delta V_{G234}{}^*$ are command adjustments provided from the secondary control(s).

Here, AGC2 is a traditional PI controller that regulates the frequency, f, and tie-line flow, $P_{tie}$. $V_4$Ctrl is another PI controller that regulates the voltage at bus 4. The DSOPF controller monitors the system frequency, tie-line flow, voltages of the five load buses, loadings of major transmission lines, power generation from G2 to G4, and the total system losses. All utility function components in Equation 2 except $U_{wind}(k)$ are formulated and minimized in this embodiment of the DSOPF controller. Both the linear PI controllers and the DSOPF controller have the same set of control variables, namely the active power outputs and terminal voltages of the three generators in the control area, G2, G3 and G4.

To demonstrate the control performance of this embodiment of the DSOPF controller, a three-phase-to-ground fault 13 happens somewhere along line 2-5 at 400 s into the simulation. This tripping of line 2-5 may cause overloading of other transmission lines. The fault event requires a redistribution of power flow in order for the 12-bus system in FIG. 3 to maintain stability.

Figure 3B:
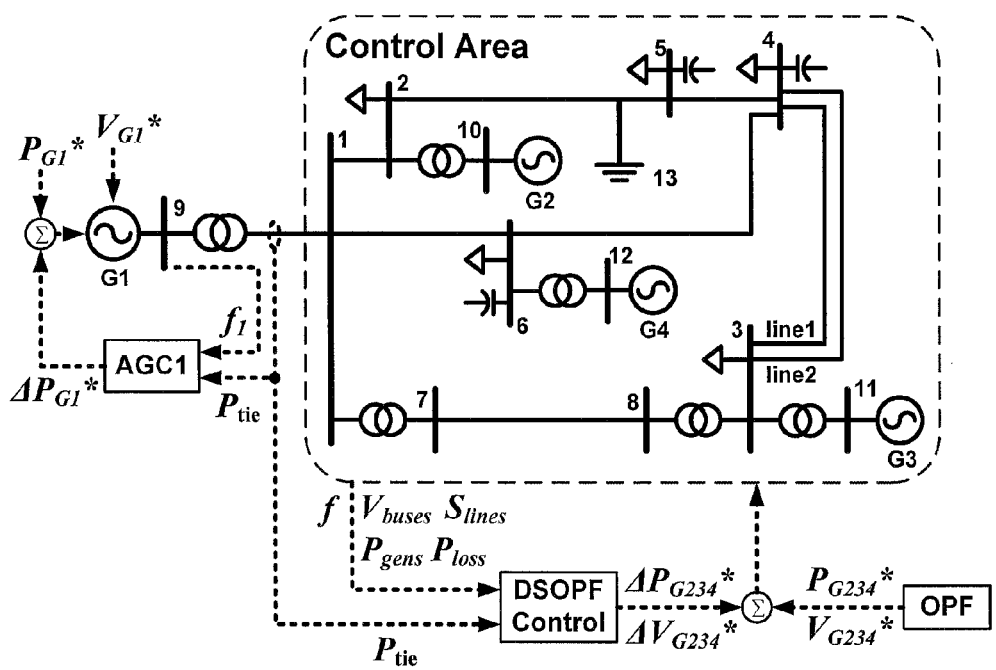
FIG. 3b is a graphical view of a 12-bus electrical power system using a DSOPF controller, performing the function of AGC and RVC.
Figure 4A:
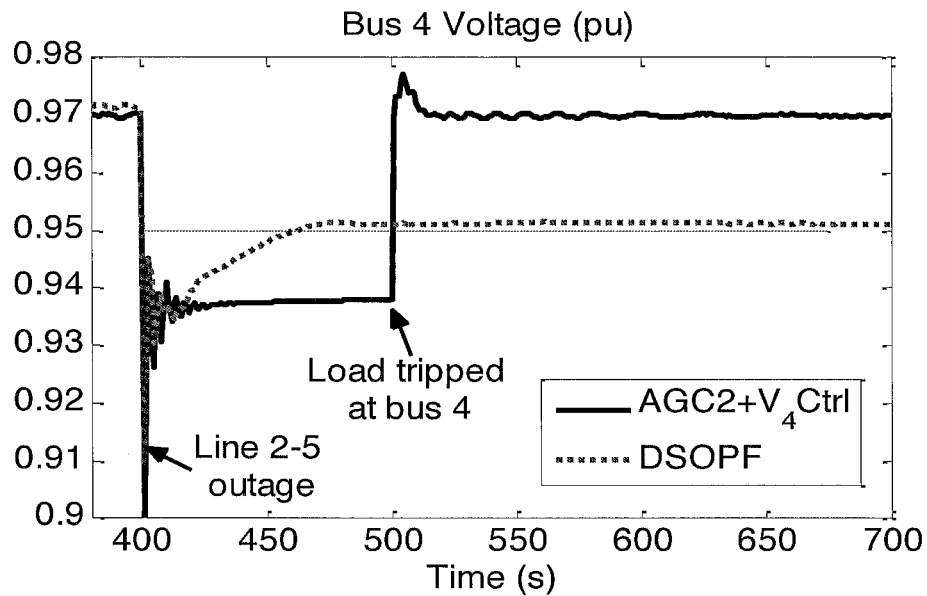
FIG. 4a is a graphical view of the bus voltage simulation results after some disturbances from a 12-bus electrical power system using traditional linear controllers.
Figure 4B:
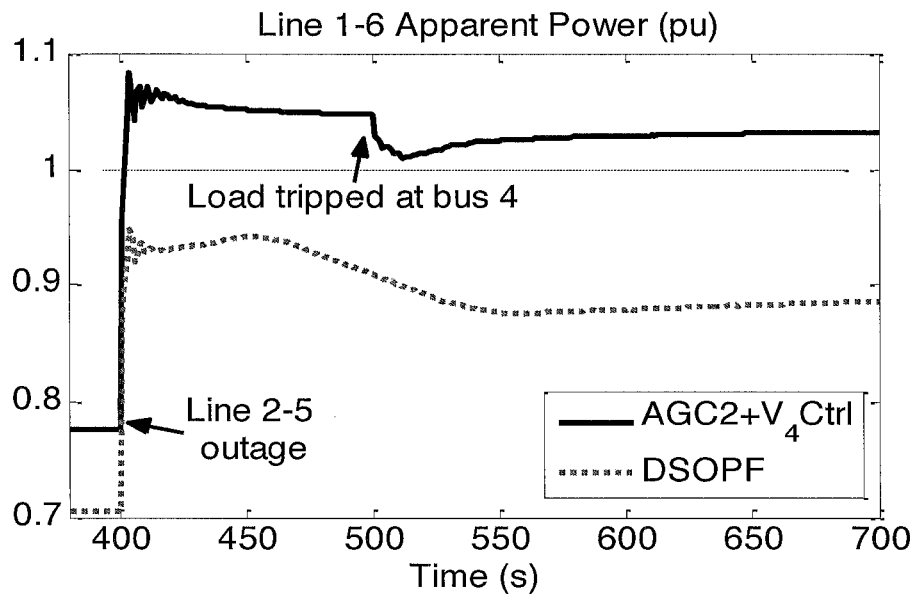
FIG. 4b is a graphical view of the bus voltage simulation results after some disturbances from a 12-bus electrical power system using a DSOPF controller.

FIGS. 4a and 4b illustrate the effects upon the power systems of FIGS. 3a and 3b when fault 13 occurs with the AGC2+V$_4$Ctrl and the DSOPF controller, respectively. When only the AGC2 and V$_4$Ctrl are used, bus 4 voltage (the lowest post-fault voltage) drops below 0.94 p.u. as shown in FIG. 4a, where p.u. stands for per unit. The PI-based V$_4$Ctrl fails to regulate the bus 4 voltage, since the reactive support from G2 is interrupted and the reactive power outputs from G3 and G4 are limited by their MVA capacities. As a result, a load of 50 MW, 20 MVAR at bus 4 is tripped at 500 s to bring the bus 4 voltage back to a normal condition. However, transmission line 1-6, which has the highest post-fault line loading, remains overloaded, as shown in FIG. 4b. Thus neither the AGC2 nor V$_4$Ctrl is capable of relieving this line overload.

Figure 5A:
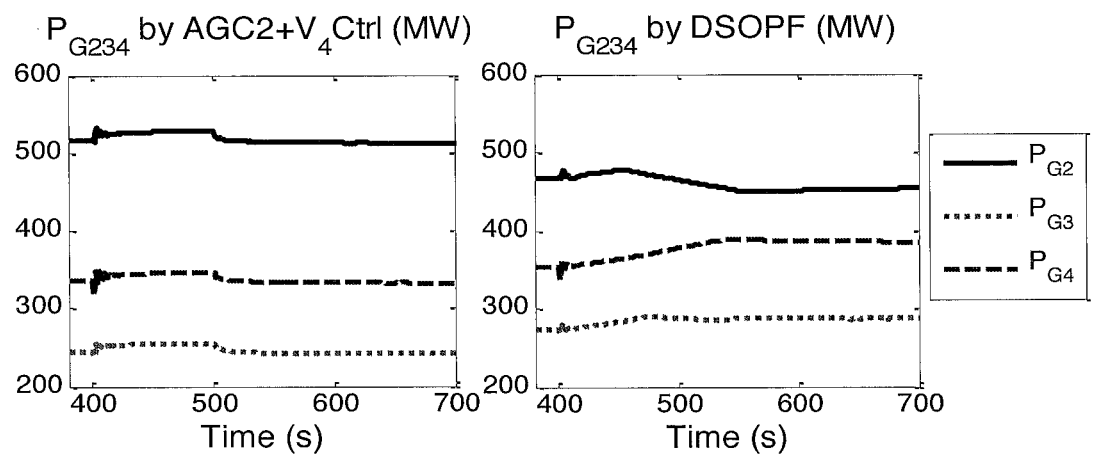
FIG. 5a is a graphical view after some disturbances of the power output in a simulated electrical power system using a DSOPF controller.
Figure 5B:
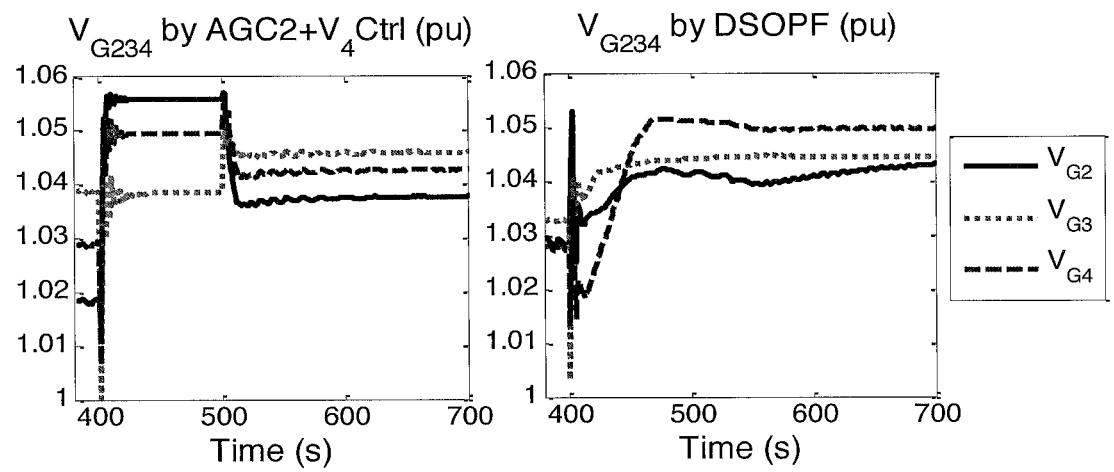
FIG. 5b is a graphical view after some disturbances of the bus voltage in a simulated electrical power system using a DSOPF controller.

By contrast and by way of illustration of a preferred embodiment of the invention, the DSOPF controller optimally adjusts both the active and reactive power flows after the outage of line 2-5 from fault 13. G2 now becomes electrically further away from the load center. The DSOPF controller transmits control data to reduce the power generation and terminal voltage from G2, as shown in FIGS. 5a and 5b. Both the voltage at bus 4 and loading of line 1-6 are maintained at normal conditions without violating any voltage or line constraints. One of the primary advantages of this scenario is that under-voltage load shedding becomes unnecessary.

Moreover, it is clear from this example that the DSOPF must be in communication with not only the sensors to collect condition data, but also the various active and reactive power generation means within the system, so that the DSOPF can send control data to the various active and reactive power controllers to control the active and reactive power within the grid. The terms active power controller and reactive power controller should not be read as limited to standard electrical controllers, but represent any means of controlling active power and reactive power in an electrical grid. The means used to control active power and reactive power generation is not, therefore, important because a person of ordinary skill understands that active and reactive power can be controlled within a grid in multiple ways.

Figure 6:
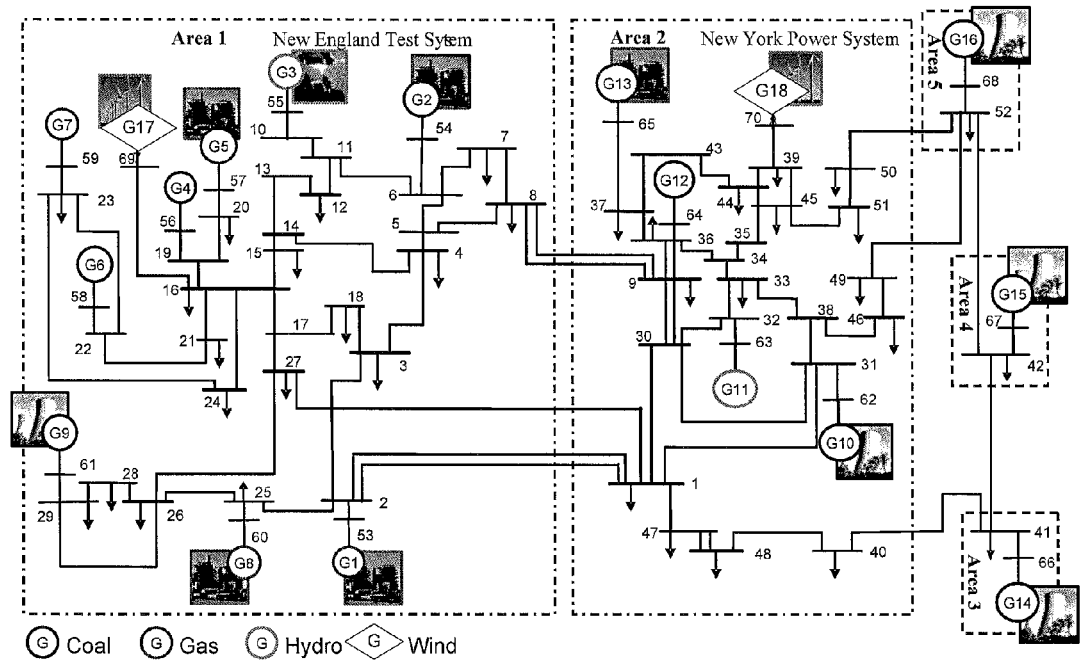
FIG. 6 is a graphical view of a 70-bus power system including two large wind-powered electrical generators under the control of a DSOPF system.
Figure 7:
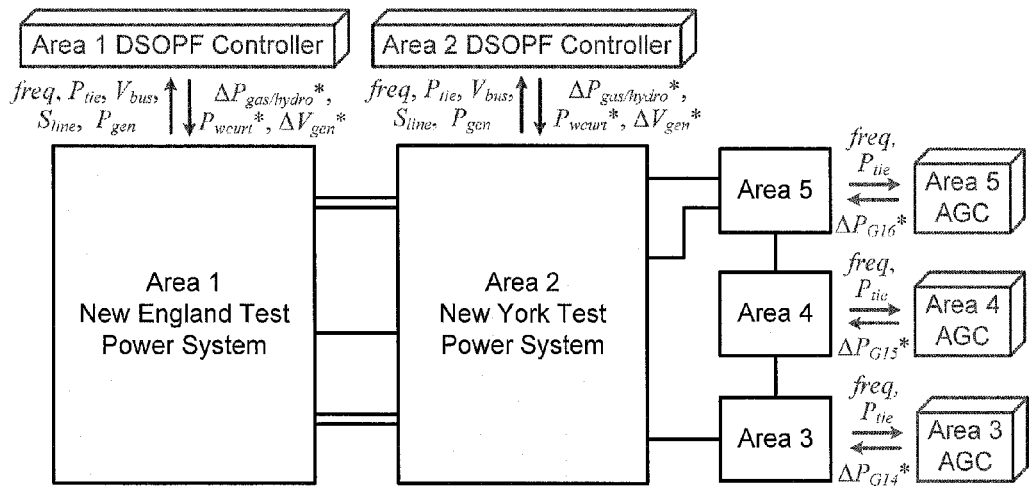
FIG. 7 is a graphical view of two DSOPF controllers controlling two areas of the 70-bus power system in FIG. 6.

Another preferred embodiment of the invention is illustrated in FIG. 6. A five-area 70-bus power system with two large wind plants (G17 and G18), as shown in FIG. 6, is used to demonstrate the capability of the DSOPF control scheme in absorbing variable wind generation. Areas 1 and 2 are mesh power grids, and areas 3 to 5 are single-bus areas. One DSOPF controller is developed for each of areas 1 and 2, as shown in FIG. 7. Areas 3 to 5 are controlled by AGCs.

Figure 8:
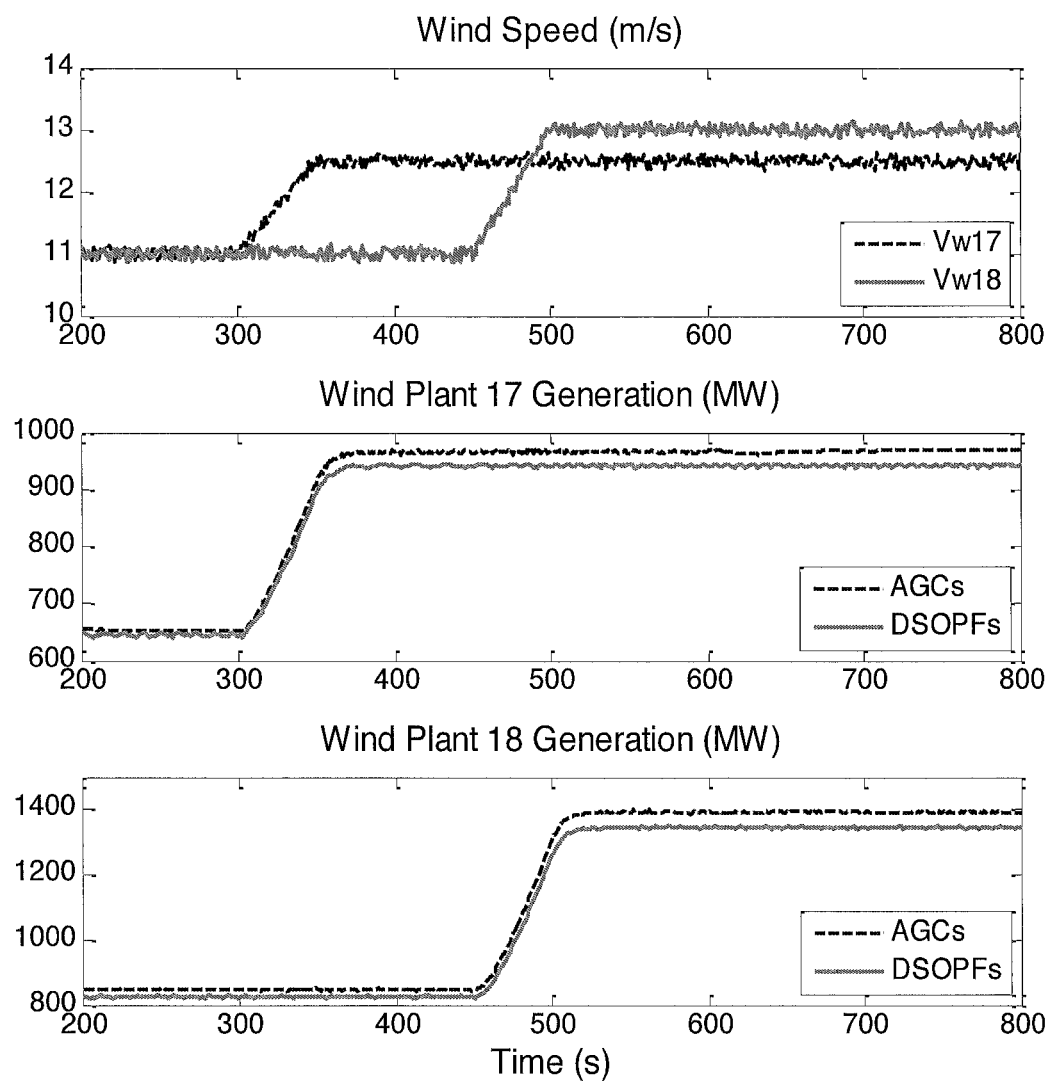
FIG. 8 is a graphical view of performance charts for two wind-powered generators indicating wind speed and power generation over time as controlled by AGC controllers and DSOPF controllers.

The variables and other indicators of FIG. 7 are as follows: freq is the system frequency measured from the each area; P$_{tie}$ denotes the tie-line power flows; V$_{bus}$ denotes voltages at different buses; S$_{line}$ denotes line loadings of transmission lines; P$_{gen}$ denotes generation from generator units; $\Delta P_{gas/hydro}$* denotes adjustments to the active electrical power commands of gas and hydro plants within the area; P$_{curt}$* denotes electrical power-from-wind curtailment commands to wind plants; $\Delta V_{gen}$* denotes adjustments to the terminal voltage commands of all generation plants within the area; $\Delta P_{G14}$* denotes the adjustment to the active power commands of G14; $\Delta P_{G15}$* denotes the adjustment to the active power commands of G15; $\Delta P_{G16}$* denotes the adjustment to the active power commands of G16;

In this example, the wind speed at wind plant G17 rises at 300 s from 11 m/s to 12.5 m/s (about 300 MW rise in 50 s); and the wind speed at wind plant G18 rises at 450 s from 11 m/s to 13 m/s (about 550 MW rise in 50 s), as shown in the top graph of FIG. 8. The control performance of the area DSOPF controllers is compared with that of using only AGCs (five AGCs, one for each area) in FIGS. 8 to 11.

Figure 9:
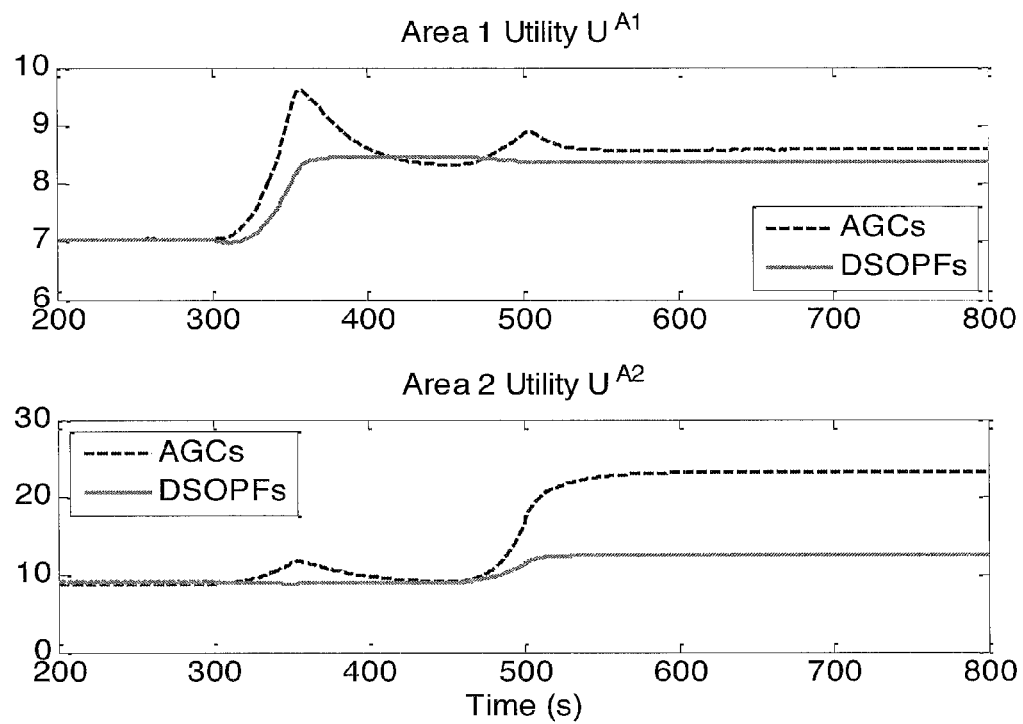
FIG. 9 is a graphical view of power output within two area electrical utilities, each containing a wind-powered generator, indicating fluctuations over time when controlled by AGC controllers and DSOPF controllers.

The resulting wind power generations from G17 and G18 are shown in the bottom two graphs of FIG. 8. When only AGCs are used, the two wind plants output all of their available wind power. The AGCs then balance the wind power rise by dropping the generation from traditional power plants. When the area DSOPF controllers are used, control data is transmitted to these generators to reduce some of the wind power (about 30 MW from G17 and 50 MW from G18). This trade-off yet brings a better overall performance. The area DSOPF controllers result in lower (better) overall utility functions than the AGCs do for both areas, as shown in FIG. 9.

Figure 10:
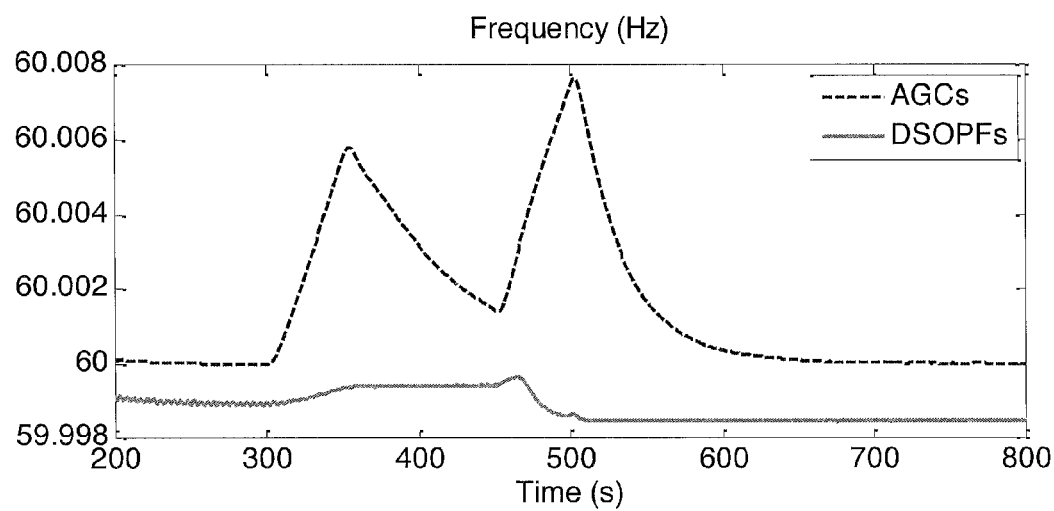
FIG. 10 is a graphical view of the frequency response within two area electrical utilities, each containing a wind-powered generator, indicating fluctuations over time when controlled by AGC controllers and DSOPF controllers.

The system frequency response during this event of a large rise in wind power is shown in FIG. 10. The AGC control results in a larger frequency deviation, because the AGCs control only the active power outputs of conventional generation units, which have relatively slow ramp rates. In contrast, the area DSOPF controllers coordinate both active and reactive power, and leverage the load-voltage characteristics to improve the system active power balancing. The area DSOPF controllers transmit appropriate control data to the generators and thereby improve stability in the system by reducing the frequency deviation.

Figure 11A:
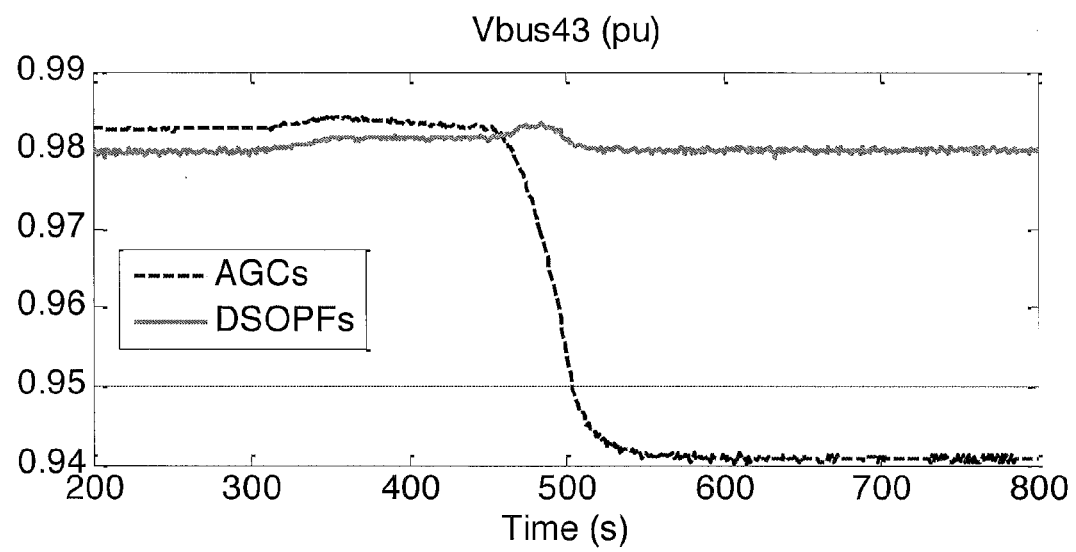
FIG. 11a is a graphical view of the voltage drop at a power system bus, indicating fluctuations over time when controlled by AGC controllers and DSOPF controllers.

The DSOPF controllers also improve bus voltages. When the AGCs are used, the voltage of bus 43 drops below 0.95 p.u. after the unexpected wind power rise, as shown in FIG. 11. The DSOPF controllers, on the contrary, are able to maintain this bus voltage almost unchanged, as shown in FIG. 11a.

Figure 11B:
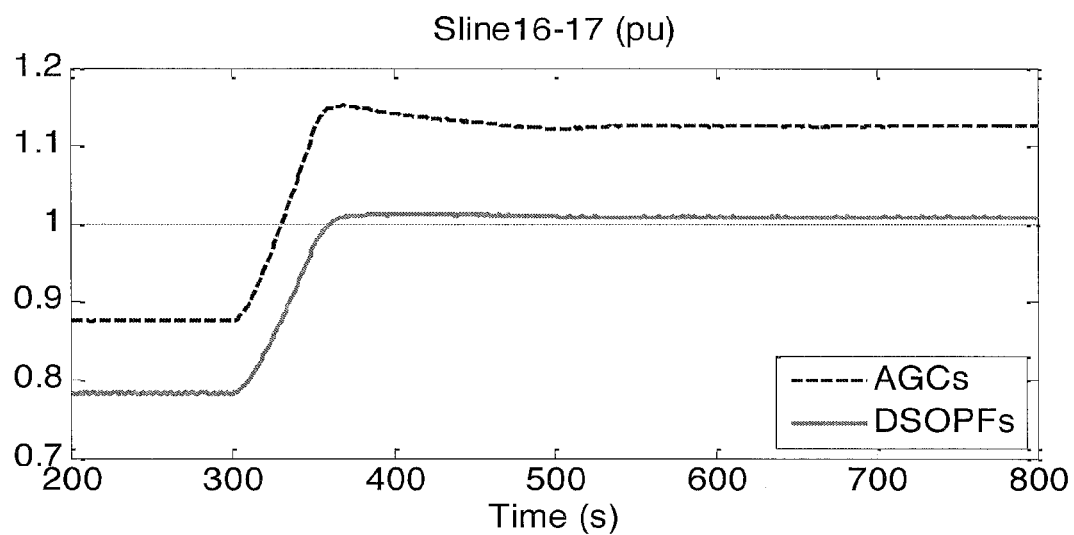
FIG. 11b is a graphical view of the MVA loading at a power system bus, indicating fluctuations over time when controlled by AGC controllers and DSOPF controllers.
Figure 11C:
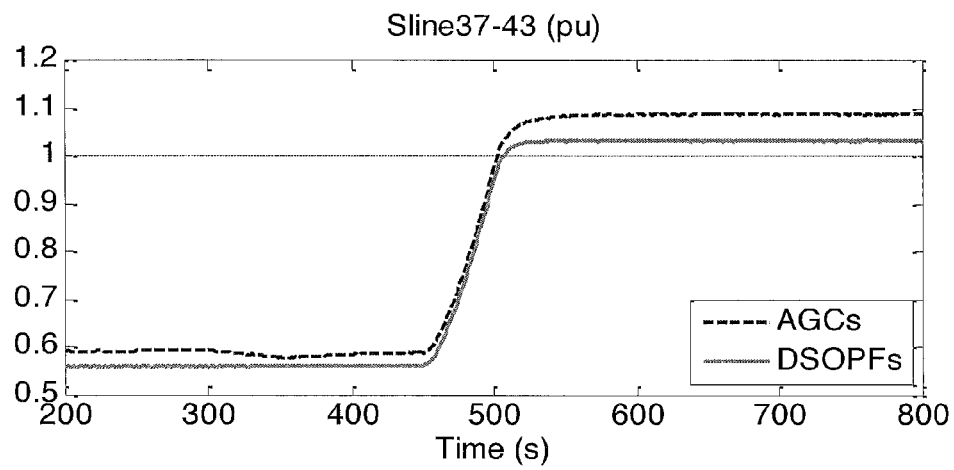
FIG. 11c is a graphical view of the MVA loading at a power system bus, indicating fluctuations over time when controlled by AGC controllers and DSOPF controllers.

FIGS. 11b and 11c show the MVA loading of line 16-17 (close to G17) and line 37-43 (close to G18), respectively. The DSOPF controllers are able to reduce the loading of these two lines after the wind power rise, but at the cost of curtailing some of the wind power (see FIG. 8). To control both the active and reactive power flows in the 70-bus power system, the area DSOPF controllers result in a better overall performance than the AGCs.

Example 2

Figure 12:
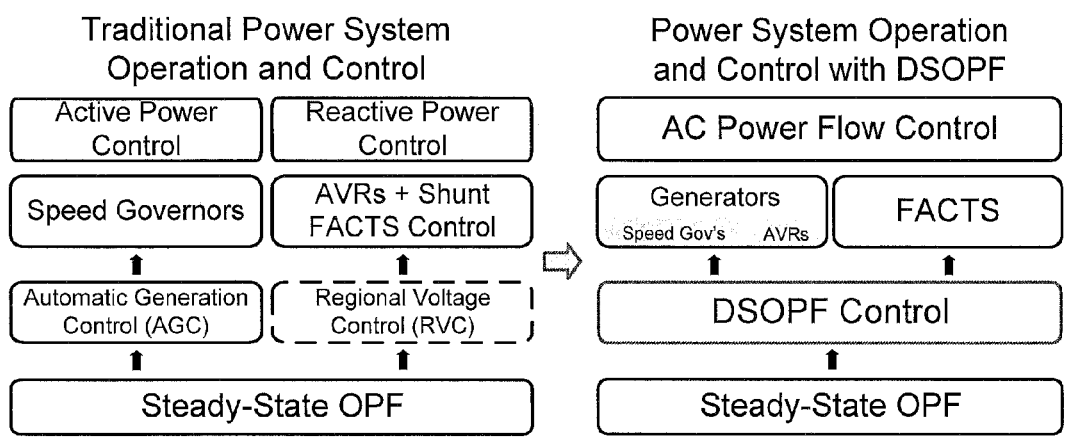
FIG. 12 is a graphical view of a dynamic stochastic optimal power flow (DSOPF) control structure for power systems within prior art power flow control system according to a preferred embodiment of the invention.

Referring now to FIG. 12, a DSOPF is illustrated within a power system to replace the traditional linear secondary control used in most prior art grid control systems. The DSOPF controller provides nonlinear optimal control to the system-wide AC power flow using an adaptive critic design (ACD) technique. Here, "Gov's" represent governors, and "AVRs" represent automatic voltage regulators.

Figure 13:
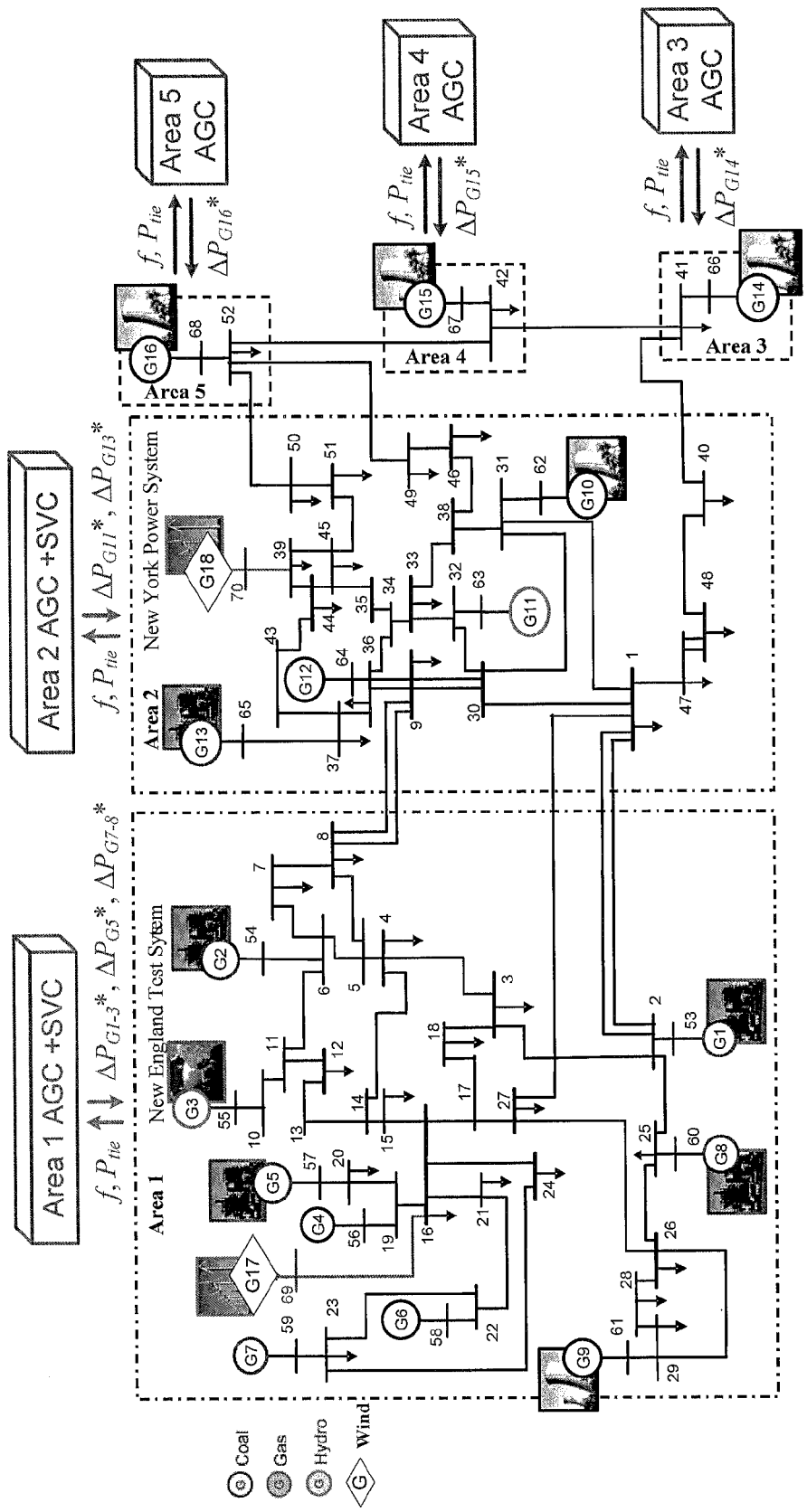
FIG. 13 is a graphical view of a 70-bus power system including two large wind-powered electrical generators under the control of an AGC and SVC.

This embodiment of the invention can be illustrated in a large power system to demonstrate its effectiveness in controlling the active and reactive power flow in a traditional grid. The 70-bus system, as shown in FIG. 13, is developed from a 68-bus New England New York test power system. Area 1 with generators G1 to G9 (7650 MVA of total installed capacity) represents the New England Test System.

Area 2 with generators G10 to G13 (14170 MVA of total installed capacity) represents the New York Power System. Generators G14 to G16 (10000 MVA each) are aggregated representations of three interconnected areas. Two additional buses, buses 69 and 70, are added to connect two large wind plants, G17 (1400 MW) and G18 (1800 MW), to the main system.

In this example, eight of the 16 conventional generation units (G4, G6, G9, G10, G12, G14, G15, and G16) are modeled as coal-fueled electrical generating plants. G1, G2, G5, G7, G8, and G13 are modeled as gas-fueled electrical generating plants. G3 and G11 are modeled as hydro-electric generating plants. No infinite bus is used to hold the system frequency fixed. All 16 conventional electrical generating machines use the 8th order synchronous machine model, and are equipped with automatic voltage regulators (AVRs) and speed governors (GOVs). A ramp rate of 1% per minute is assumed for the coal plants. For the gas and hydro plants, the ramp rates are assumed to be 5% per minute and 5% per second, respectively. Typical AVR and governor parameters for coal, gas, and hydro plants are used.

An aggregated doubly-fed induction generator (DFIG) wind turbine system as shown in FIG. 13 is used for both wind plants. Other types of wind generators could also be used. The power electronic converters are modeled as three-phase controllable voltage sources. Both wind plants follow the maximum-power-point operation up to their maximum power ratings. External control signals for wind curtailments in MW are also implemented.

Five AGCs (one for each area) are implemented for the 70-bus power system, as shown in FIG. 13, to regulate the inter-area tie-line power flow and system frequency. For areas 1 and 2, the AGCs control only the gas and hydro generation units, which have fast ramping capability as compared to the coal-based units. For areas 3 to 5, the AGCs control the aggregated generator in each area. SVCs are also implemented for areas 1 and 2. Buses 5, 16, 26, 31, and 36 are selected as pilot buses for areas 1 and 2. Their neighboring generators G2, G4, G9, G10, and G12 are used to control the respective pilot-bus voltage to 1 pu. This AGCs+ SVCs control scheme provides the base-case control scenario with existing linear secondary control techniques. Its performance will be later compared to the proposed two-level DSOPF controller. In the presence of high variability and uncertainty, the DSOPF control algorithm performs well.

A two-level DSOPF control architecture, as shown in FIG. 14a, is provided to divide the DSOPF control into multiple area controllers and one global controller. Since areas 3 to 5 are single-bus systems, their AGCs are retained for regulating the frequencies and tie-line flows. Area 1 and Area 2 DSOPF controllers, 2 and 3, each monitor and control the power flow within its own network, 4 and 5, respectively. The global DSOPF controller monitors critical lines (lines that often get congested) from the two areas, 4 and 5, and coordinates the area controllers, 2 and 3, by adjusting the tie-line power flow commands between the areas. This two-level architecture distributes the control and computation burden to multiple area DSOPF controllers, and reduces the training difficulty for implementing dynamic power flow control for a large network.

In this example, the data (all monitoring samples and control commands) update rate of the area DSOPF controllers is once per second. The data update rate of the global DSOPF controller is once every 10 seconds.

For the DSOPF control, U(k) could be a function of the total energy cost, bus voltage deviation, frequency deviation, tie line flow deviation, line loading, line loss, generator stability margin, and/or other indices related to the system economy, stability and security. The two area DSOPF controllers, 2 and 3, are at the same control level and interact with each other. Changes (due to neural network training) to one DSOPF controller will affect the plant dynamics "seen" by the other one. To reduce this training interaction, each area DSOPF controller is initially designed and trained with the rest of the system controlled by fixed linear secondary controllers.

After the initial training stage, the two area DSOPF controllers are connected to the system at the same time, but updated sequentially. In this step, one area DSOPF controller will learn the system dynamics with the other area DSOPF controller present.

Design and Initial Training of Area 1 DSOPF Controller

Figure 15:
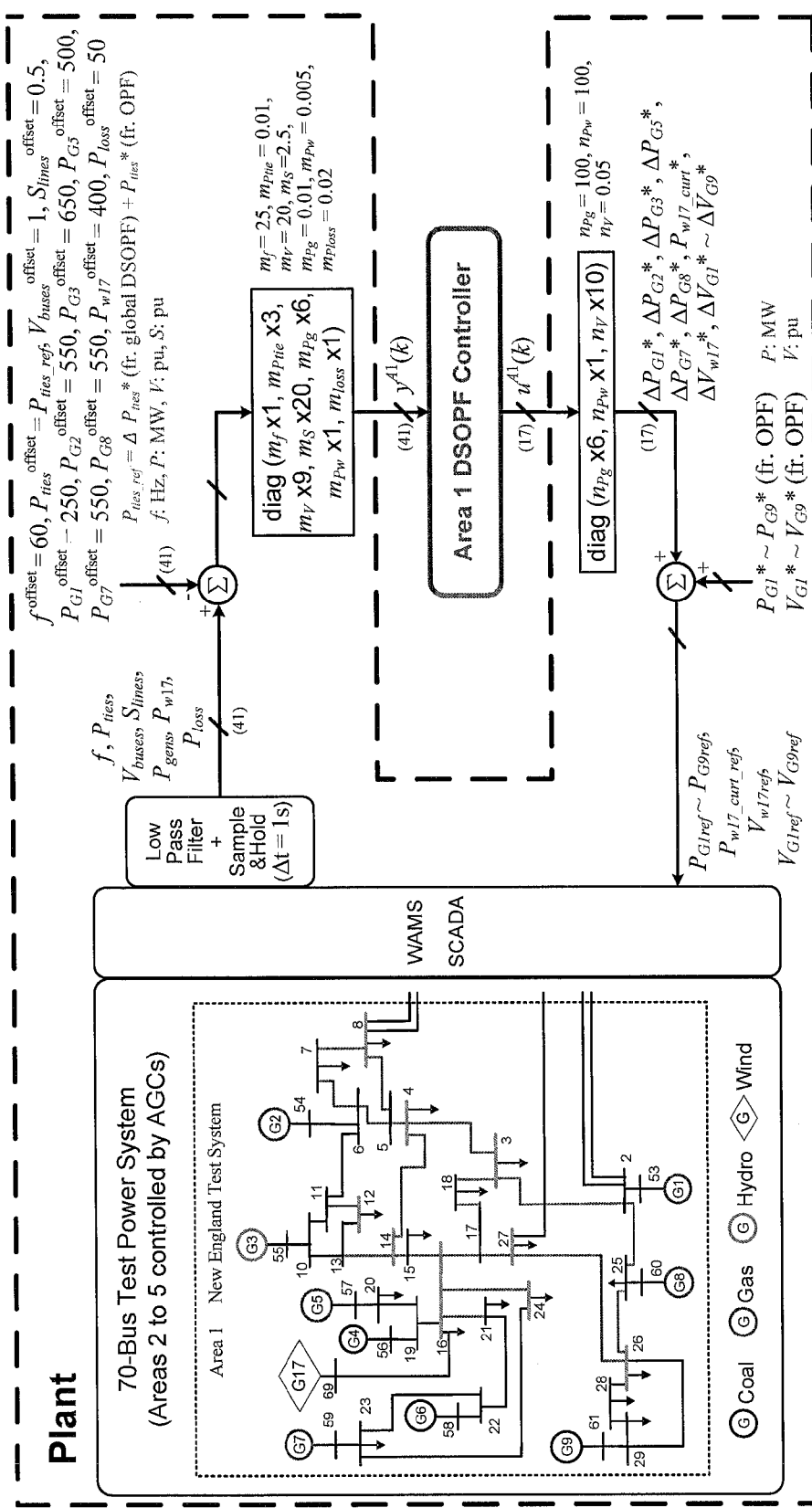
FIG. 15 is a graphical view of a multi-bus power system under the control of a DSOPF system.

The Area 1 DSOPF controller of FIG. 14a is designed to replace and expand the function of Area 1 AGC and SVC. The nonlinear dynamic plant connected to the Area 1 DSOPF controller is illustrated in FIG. 15. Forty-one smoothed wide-area measurements are sampled at 1 Hz for the Area 1 DSOPF controller. As illustrated in FIG. 15, these 41 measurements include the area frequency, the tie-line power export, the RMS voltage at the nine buses, the MVA loading of 20 lines, the active power outputs from the six fast-ramping generators, the active power output from the wind plant, and the total active power loss in area 1. The monitored buses and lines are selected such that they cover a large portion of the area mesh network. These 41 measurements are then scaled linearly to have the same order of magnitude in the range of [−1, 1]. The plant output for the Area 1 DSOPF controller, $y^{A1}(k)$, is obtained. The DSOPF control still holds with alternative number of measurements less than or more than 41.

The plant input or control action, $u^{A1}(k)$, has 17 components. $u^{A1}_1(k)$ to $u^{A1}_6(k)$ are adjustment signals to change the active power outputs of G1, G2, G3, G5, G7, and G8, respectively. $u^{A1}_7(k)$ is a positive curtailment signal to wind plant G17. $u^{A1}_8(k)$ to $u^{A1}_{17}(k)$ are adjustment signals to change the terminal voltages of G1 to G9, and G17. These 17 inputs, which are easily monitored with sensors connected to the power generation devices and the grid, are then scaled (such that each element in $u^{A1}(k)$ is in the range of [−1, 1]) and added to the steady-state dispatches obtained from the traditional OPF algorithm. The DSOPF control still holds with alternative number of inputs less than or more than 17.

The utility function of the Area 1 DSOPF controller has seven components, as in $$U^{A1}(k) = U^{A1}_{ACE}(k) + U^{A1}_{Volt}(k) + U^{A1}_{Line}(k) + U^{A1}_{Fuel}(k) + U^{A1}_{Wind}(k) + U^{A1}_{Loss}(k) + U^{A1}_{Ctrl}(k)$$  Function (2)

Each of the seven utility components (also defined as sub-utilities) is explained below.

$U^{A1}_{ACE}(k)$ is a sub-utility index representing the area control error of area 1, as in $$U^{A1}_{ACE}(k) = w_{freq}\Delta f(k)^2 + w_{tie}\|\Delta P_{tie}(k)\|^2$$  Function (3)

where $\|.\|$ represents the Euclidean norm. $\Delta f(k)$ is the frequency deviation. $\Delta P_{tie}(k)$ is a vector containing the tie-line power flow deviation of area 1. $w_{freq}$ and $w_{tie}$ are weighting factors. In this paper, all the weighting factors, $w_x$'s, are heuristically selected such that each component in the Function (2) has the same order of magnitude and thus similar impact on the final objective. A higher weighting factor gives a higher priority to the corresponding component, and these weights may be changed according to the system conditions and specific designs.

$U^{A1}_{Volt}(k)$ is a sub-utility index representing the overall voltage deviations in area 1, as in $$U_{Volt}^{A1}(k) = w_{volt}\|\Delta V(k)\|^2 \quad \text{Function (4)}$$

where $\Delta V(k)$ contains the voltage deviation of all the monitored buses in area 1.

$U^{A1}_{Line}(k)$ is a sub-utility index representing the overall line loadings in area 1, as in $$U_{Line}^{A1}(k) = w_{line}\sum_i e^{(S^4_{line\_i}(k)-1)} \quad \text{Function (5)}$$

where $S_{line\_i}(k)$ is the apparent power loading of the $i^{th}$ monitored transmission line in area 1.

$U^{A1}_{Fuel}(k)$ is a sub-utility index representing the overall fuel cost of the monitored generators in area 1, as in $$U_{Fuel}^{A1}(k) = w_{fuel}\left[\sum_i F_{G\_i}(k) - F^{offset}\right] \quad \text{Function (6)}$$

where $F_{G\_i}(k)$ is the cost function of the $i^{th}$ monitored generator in area 1. $F^{offset}$ is a bias constant for scaling the cost functions.

$U^{A1}_{Wind}(k)$ is a sub-utility index representing the percentage wind curtailment, as in $$U_{Wind}^{A1}(k) = w_{wind}\frac{P_{wind\_curt}(k)}{P_{wind\_curt}(k) + P_{wind\_gen}(k)} \quad \text{Function (7)}$$

$P_{wind\_curt}(k)$ is the curtailed wind power resulting from the control action of the Area 1 DSOPF controller. $P_{wind\_gen}(k)$ is the actual generated wind power.

$U^{A1}_{Loss}(k)$ is a sub-utility index representing the overall transmission losses in area 1, as in $$U_{Loss}^{A1}(k) = w_{loss}P_{loss}(k) \quad \text{Function (8)}$$

where $P_{loss}(k)$ is the total estimated transmission losses obtained from wide-area measurements.

$U^{A1}_{Ctrl}(k)$ is a sub-utility index representing the control effort of the area 1 DSOPF controller, as in $$U_{Ctrl}^{A1}(k) = w_{Pg}\|\Delta P_G^*(k)\|^2 + w_{Pw}P_{wcurt}^*(k)^2 + w_{Vg}\|\Delta V_G^*(k)\|^2 \quad \text{Function (9)}$$

$\Delta P_G^*(k)$ is the active power adjustment commands to the fast-ramping generators in area 1. $P_{wcurt}^*(k)$ is the curtailment command to the wind plant in area 1. $\Delta V_G^*(k)$ is the terminal voltage adjustment commands to all the generators in area 1.

Based on the DHP adaptive critic design scheme shown in FIG. 14, three recurrent neural networks (RNNs) are used to implement the model, critic, and action networks. Each RNN has 80 internal neurons and more than 10,000 weights, but these values can be varied and should not be taken as a limitation of the invention.

The model network is first trained offline to identify the plant dynamics. Perturbation signals are injected to the system at different operating conditions. The system responses are then recorded to train the model network by minimizing the following error $$E_m^{A1}(k) = \|e_m^{A1}(k)\|^2 = \|y^{A1}(k) - \hat{y}^{A1}(k)\|^2 \quad \text{Function (10)}$$

where $\hat{y}^{A1}(k)$ is obtained from one-step delay of the model network output. In other words, the model network is trained to provide one-step-ahead prediction and identify the plant dynamics. Good testing results are generally achieved at all training cases after a few thousand training iterations.

After the offline training of the model network, the DHP critic network is trained online to approximate $\lambda^{A1}(k+1)$, the derivative of $J^{A1}(k+1)$ with respect to $y^{A1}(k+1)$. The critic network is trained by minimizing $$E_c^{A1}(k) = \|e_c^{A1}(k)\|^2 \quad \text{Function (11)}$$

$$e_c^{A1}(k) = \hat{\lambda}^{A1}(k) - \left\{\frac{\partial U^{A1}(k)}{\partial y^{A1}(k)} + \frac{\partial U^{A1}(k)}{\partial u^{A1}(k)}\frac{\partial u^{A1}(k)}{\partial y^{A1}(k)} + \gamma\hat{\lambda}^{A1}(k+1)\left[\frac{\partial \hat{y}^{A1}(k+1)}{\partial y^{A1}(k)} + \frac{\partial \hat{y}^{A1}(k+1)}{\partial u^{A1}(k)}\frac{\partial u^{A1}(k)}{\partial y^{A1}(k)}\right]\right\}$$

where the partial derivatives are obtained from the model network, the action network, and the utility Function (2).

The action network is trained online to approximate the optimal control law by minimizing $$E_a^{A1}(k) = \left\|\frac{\partial \hat{J}^{A1}(k)}{\partial u^{A1}(k)}\right\|^2 \quad \text{Function (12)}$$

$$\frac{\partial \hat{J}^{A1}(k)}{\partial u^{A1}(k)} = \frac{\partial U^{A1}(k)}{\partial u^{A1}(k)} + \gamma\hat{\lambda}^{A1}(k+1)\frac{\partial \hat{y}^{A1}(k+1)}{\partial u^{A1}(k)}$$

where partial derivatives are obtained from the model network and the utility Function (2). During the action training, when $E_a^{A1}(k)$ becomes zero, $u^{A1}(k)$ is the optimal control action that minimizes $J^{A1}(k)$ in the local region. A global near-optimal is obtained by exposing the Area 1 DSOPF controller to different system conditions.

Initial Training of Area 2 DSOPF Controller

Figure 16:
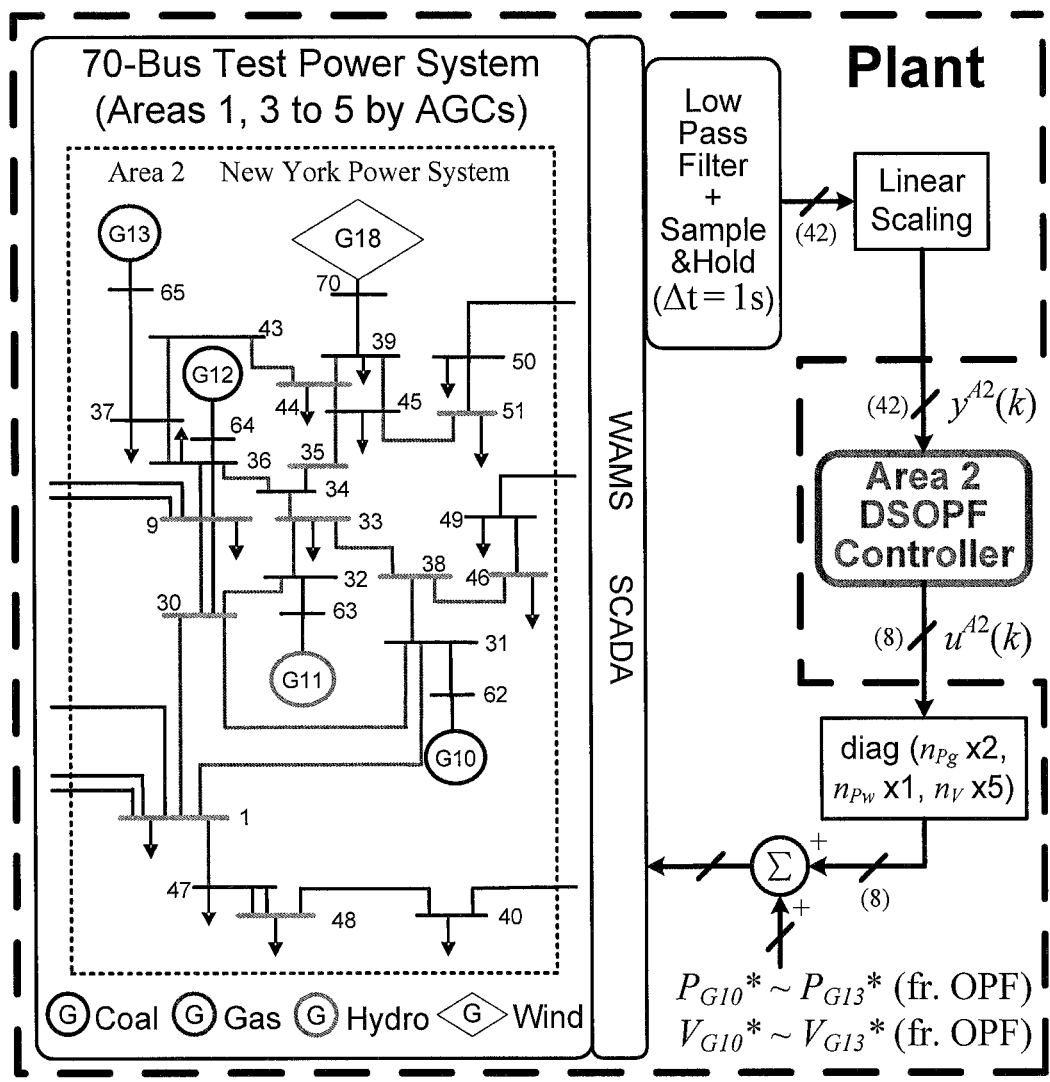
FIG. 16 is a graphical view of a multi-bus power system under the control of a DSOPF system.

The Area 2 DSOPF controller follows the similar design procedures as the Area 1 DSOPF controller. The details are thus not repeated here. During the initial training of the Area 2 DSOPF controller, areas 1, 3, 4, and 5 are controlled by linear secondary controllers. FIG. 16 illustrates a plant interface with the Area 2 DSOPF controller. Forty-two smoothed measurements are taken from the dynamic plant, including information of frequency, voltage, line loading, etc. The controller has 8 outputs, including active power adjustment signals to G11 and G13, a curtailment signal to the wind plant G18, and terminal voltage adjustment signals to all generators in area 2. The area 2 utility function also consists of seven components, similar to those described by Functions (3) to (9).

Sequential Training of Area 1 and 2 DSOPF Controllers

After the initial training stage, the two area DSOPF controllers, 2 and 3, in FIG. 14*a* are connected to the system at the same time (replacing Area 1 and 2 AGCs and SVCs) for further online adaptation. This step allows one DSOPF controller to learn the system dynamics changes introduced by the other DSOPF controller.

This online adaptation is done sequentially for the two area DSOPF controllers, 2 and 3, in FIG. 14a. When one area DSOPF is being trained, the other one is fixed (no weight updates). This back and forth training of the two area DSOPF controllers continues until the critic and action errors of both area DSOPF controllers converge. In this example (a 70-bus system with two area DSOPF controllers), the online adaptation process converges relatively quickly after a few iterations between the two controllers.

Control Performance of the Area DSOPF Controllers

After training, two different cases are studied below to evaluate the capability of the area DSOPF controllers, 2 and 3, in FIG. 14a in absorbing wind power variability and uncertainty.

Case 1

Large Wind Power Variation

Figure 17:
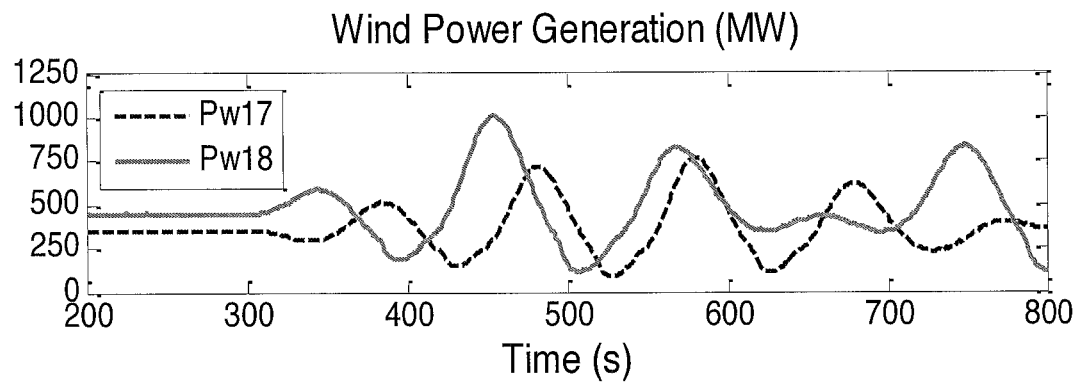
FIG. 17 is a graphical view of performance charts for two wind-powered generators indicating wind speed and power generation over time as controlled by AGC controllers and DSOPF controllers.

A large wind variation is applied to wind plants G17 and G18 starting at 300 s, as shown in FIG. 17. This example is used to study the controller performance in the presence of high wind variability.

Figure 18:
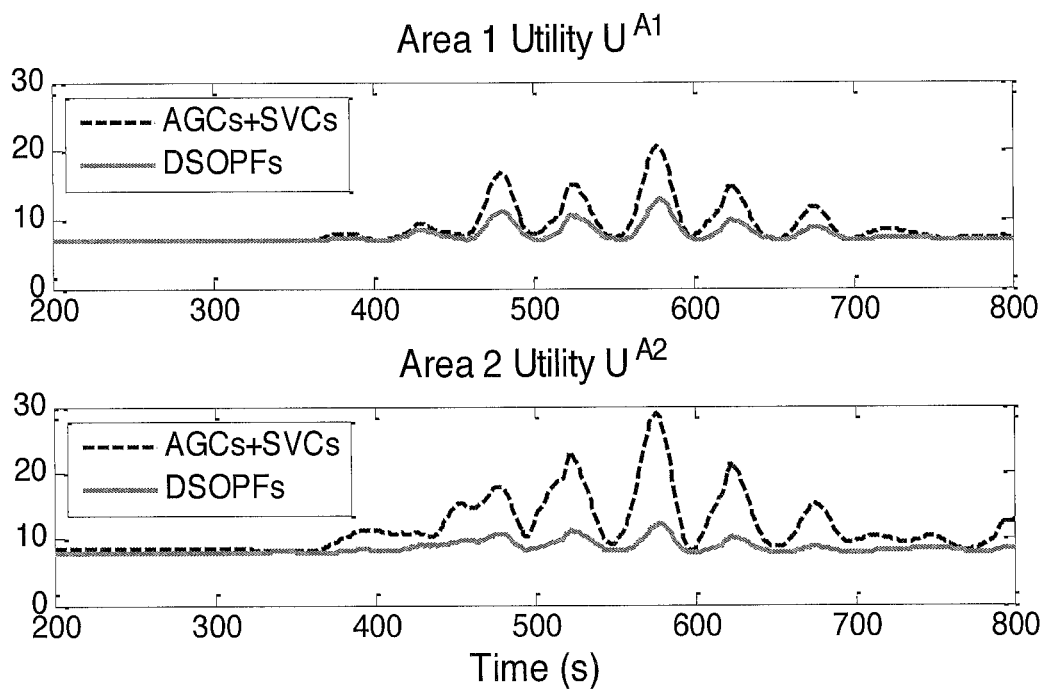
FIG. 18 is a graphical view of performance charts for two wind-powered generators indicating wind speed and power generation over time as controlled by AGC controllers and DSOPF controllers.

In this example, no wind curtailment is generated from the area DSOPF controllers. With the same wind power variation, the area DSOPF controllers result in a lower overall utility than AGCs+SVCs, as shown in FIG. 18. In other words, a better overall quasi-steady-state performance is achieved by the area DSOPF controllers.

Figure 19:
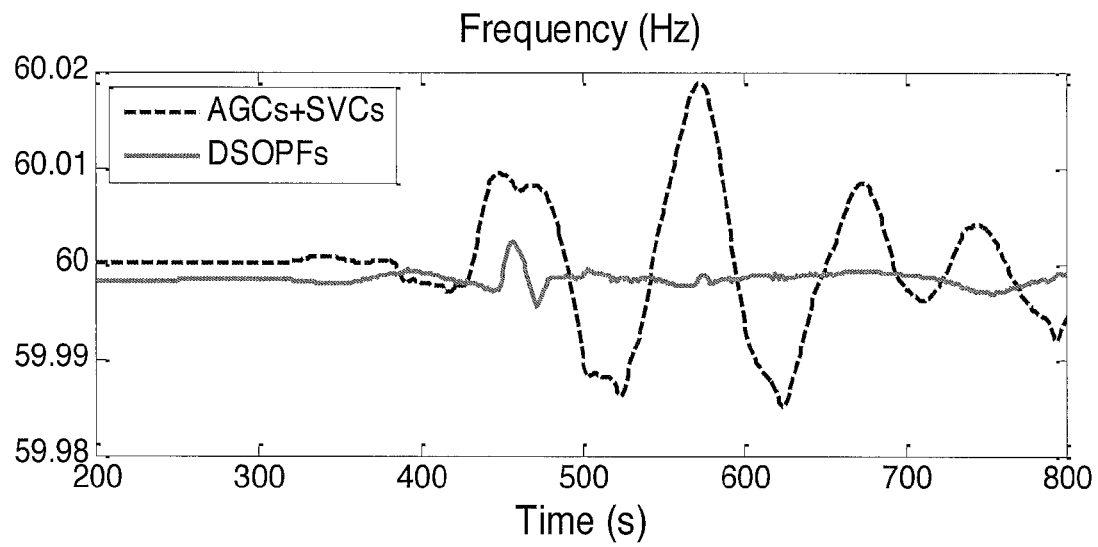
FIG. 19 is a graphical view of the frequency response performance charts for a power system over time as controlled by AGC controllers and DSOPF controllers.

By leveraging the load-voltage characteristics, the DSOPF controllers result in less frequency variation, as shown in FIG. 19. The DSOPF controllers temporarily increase the voltage and thereby increasing load consumption, when the frequency is high. Neither the AGCs nor the SVCs can achieve this performance, since they decouple the active and reactive power control. AGCs do not control voltage, and SVCs do not respond to frequency deviation.

Figure 20:
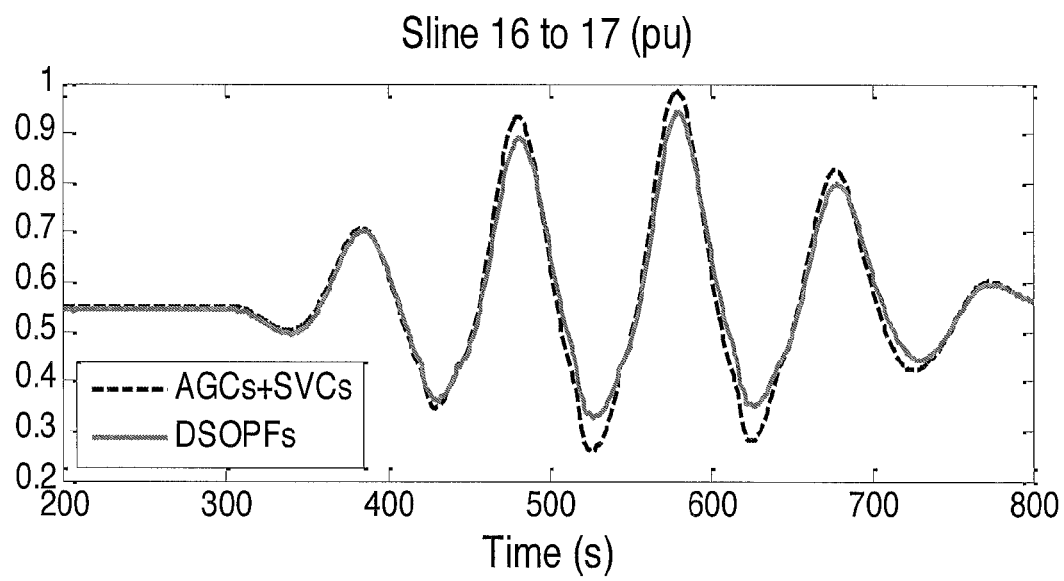
FIG. 20 is a graphical view of performance charts for a power system over time as controlled by AGC controllers and DSOPF controllers.

During this event of large wind variation, no violation of bus voltage or line loading is observed for both the linear control and DSOPF control. However, the area DSOPF controllers are able to better regulate the line flow, since one of its control objectives is to even the line loadings. As shown in FIG. 20, the DSOPF controllers dynamically relieve the loading on line 16-17 (close to wind plant G17) when the wind generation from G17 is high.

Case 2

Large Unexpected Wind Power Rise

To demonstrate the performance of the area DSOPF controllers in absorbing wind uncertainty, the following events are applied to the 70-bus system: at 300 s, a rise of the wind speed at wind plant G17 from 11 m/s to 12.5 m/s (about 300 MW rise in 50 s); at 450 s, a rise of the wind speed at wind plant G18 from 11 m/s to 13 m/s (about 550 MW rise in 50 s).

Figure 21:
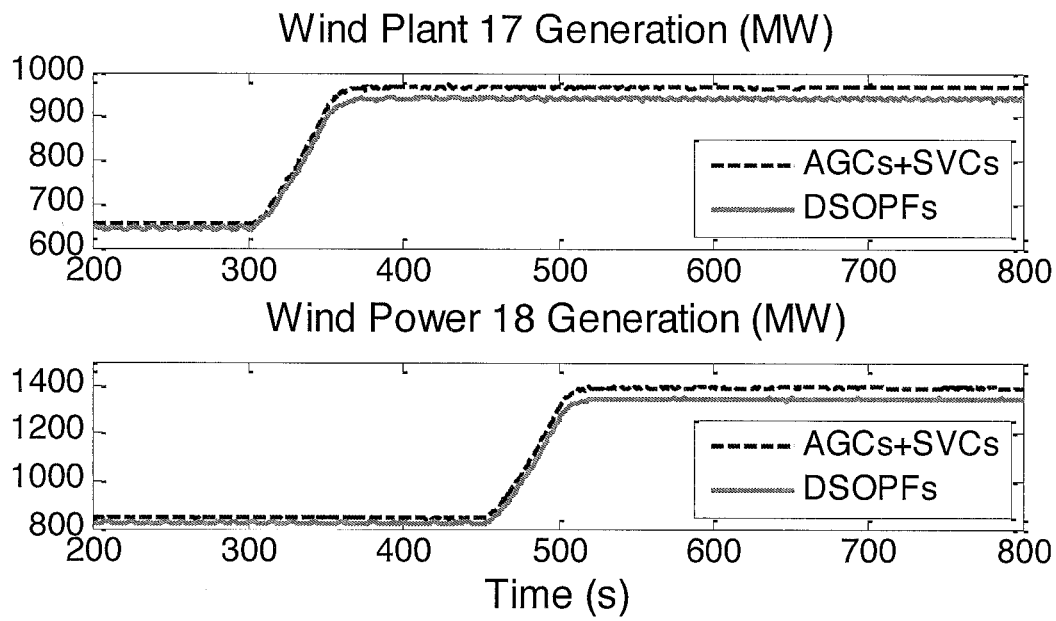
FIG. 21 is a graphical view of performance charts for a power system with wind-powered generators over time as controlled by AGC controllers and DSOPF controllers.
Figure 22:
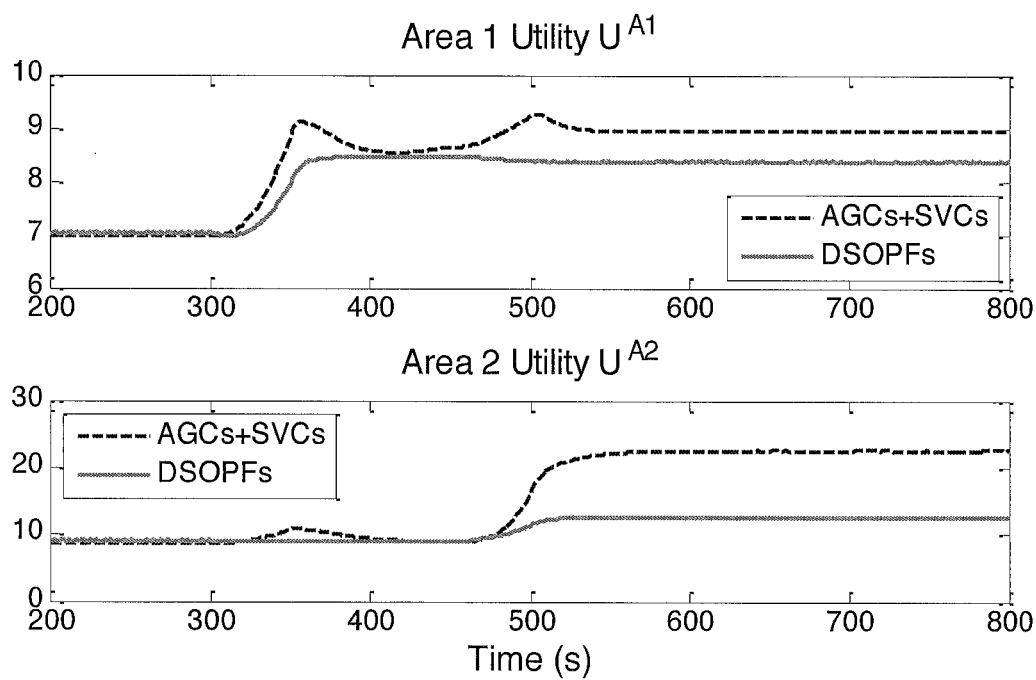
FIG. 22 is a graphical view of performance charts for a power system over time as controlled by AGC controllers and DSOPF controllers.

The resulting power generation from the two wind plants is shown in FIG. 21. When AGCs+SVCs are used, the two wind plants output all of their available wind power. When the area DSOPF controllers are used, some of the wind power (about 30 MW from G17 and 50 MW from G18) is curtailed. However, this trade-off brings a better overall performance (lower overall utilities) for both areas, as shown in FIG. 22.

Figure 23:
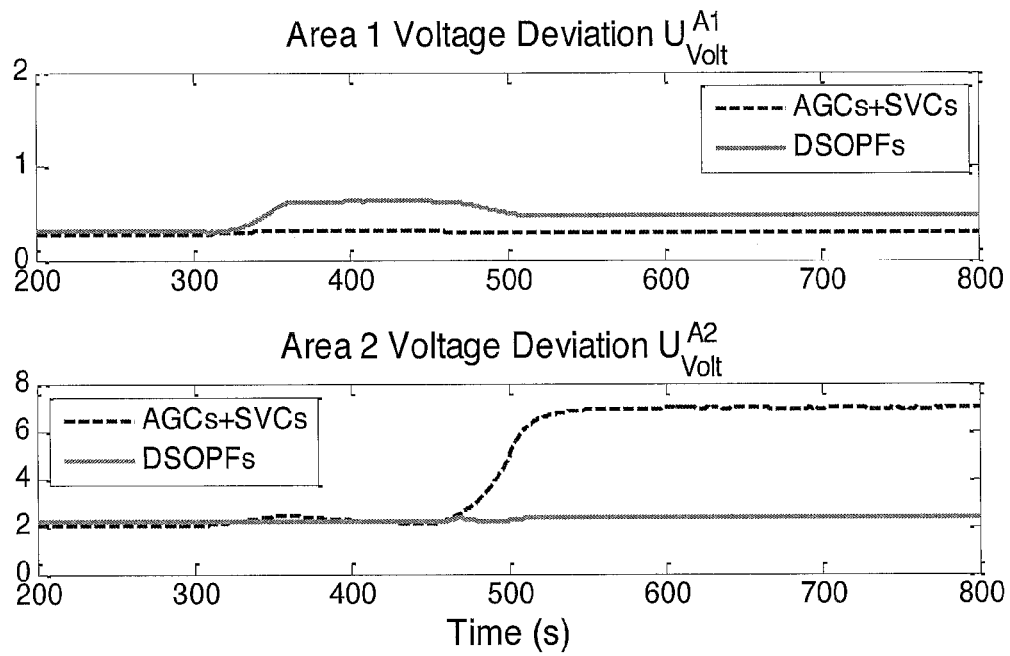
FIG. 23 is a graphical view of performance charts for a power system over time as controlled by AGC controllers and DSOPF controllers.
Figure 24:
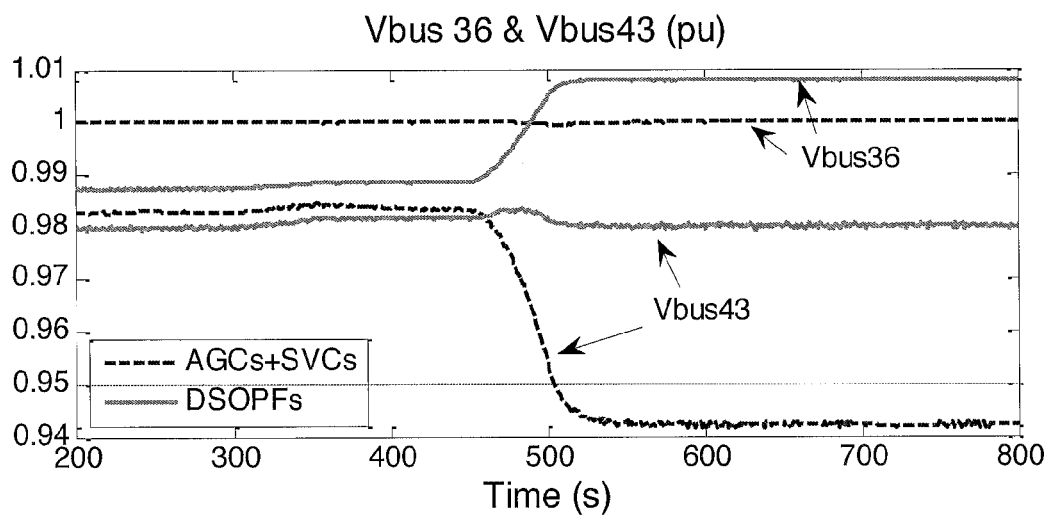
FIG. 24 is a graphical view of performance charts for a power system over time as controlled by AGC controllers and DSOPF controllers.

For the system-wide voltage profile, the linear secondary controller results in slightly better performance than the area DSOPF controller in area 1, as shown in FIG. 23. However, for area 2, the linear secondary controller results in a significantly higher voltage utility index, which is an indication of possible voltage violation. FIG. 24 shows the voltage at bus 43 and bus 36 (a pilot bus for SVC). The transmission link "bus 44-43-37" is a weak connection. When the AGCs+SVCs are used, a sudden increase in the wind power from G18 (followed by ramping down of the gas plant at bus 37) causes an increased power flow through the weak transmission link and drops the voltage at bus 43 to below 0.95 pu. Maintaining its close-by pilot-bus voltage at 1 pu is not sufficient in bringing back the voltage at bus 43. In contrast, the area DSOPF controllers are able to maintain this bus voltage.

Figure 25:
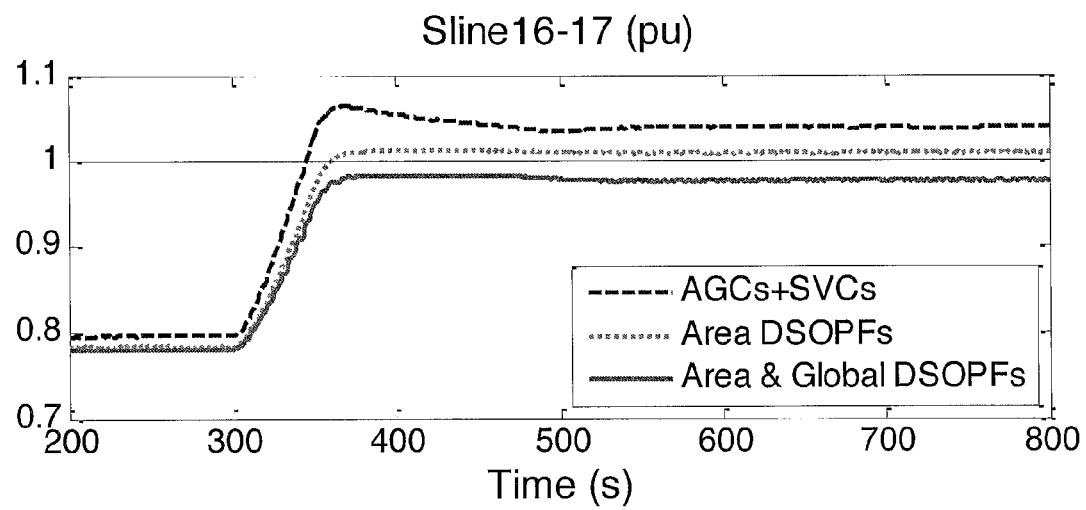
FIG. 25 is a graphical view of performance charts for a power system over time as controlled by AGC controllers and DSOPF controllers.
Figure 26:
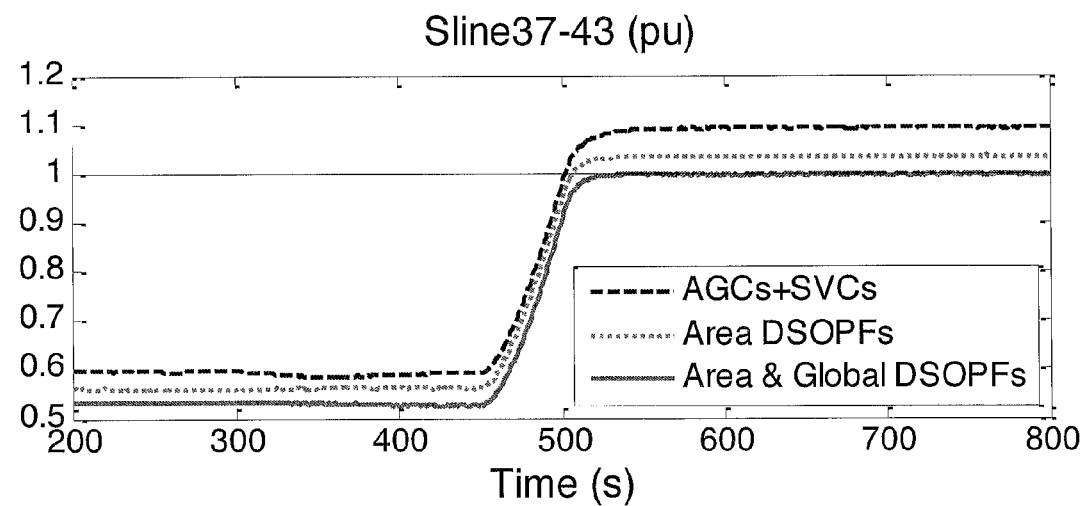
FIG. 26 is a graphical view of performance charts for a power system over time as controlled by AGC controllers and DSOPF controllers.

The area DSOPF controllers also result in lower (better) utility indices for line loadings, as shown in FIG. 25. Thus, the line loadings across the system are more evenly distributed, when the area DSOPF controllers are used. Line 16-17 is one of the most affected lines during this wind power rise. The area DSOPF controllers are able to reduce the loading of this line, as shown in FIG. 26, but at the cost of curtailing some of the wind power (see FIG. 21). Note that before 300 s, the loading of line 16-17 is lower when the area DSOPF controllers are used. This is due to the fact that the DSOPF controllers are capable of adjusting the steady-state dispatch based on its objective function.

Design and Performance of the Additional Global DSOPF Controller

The loadings of line of 16-17 in area 1 (close to G17) and line 37-43 in area 2 (close to G18) are sensitive to unexpected wind power changes. A global DSOPF controller is designed to coordinate the Area 1 & 2 DSOPF controllers and to relieve the line loading of these two transmission lines.

Design of the Global DSOPF Controller

Figure 27:
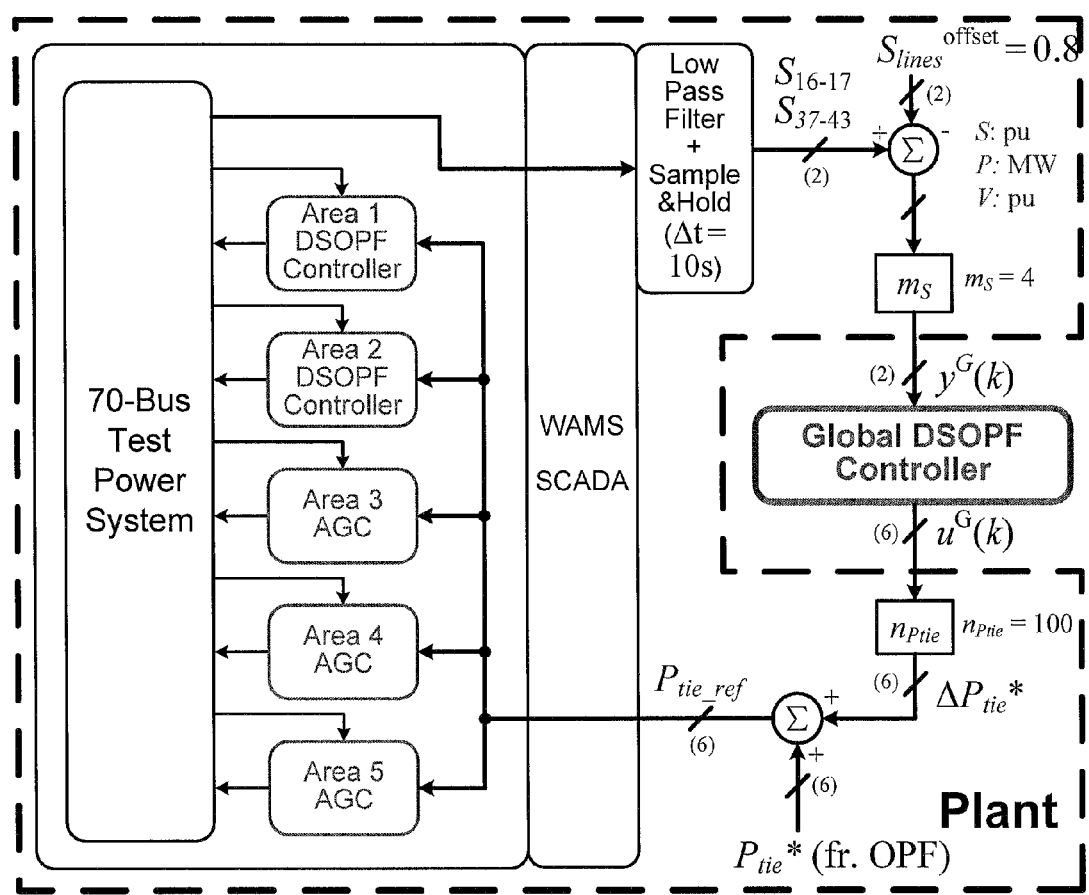
FIG. 27 is a graphical view of a nonlinear dynamic plan connected to a global DSOPF controller.

The nonlinear dynamic plant connected to the global DSOPF controller is shown in FIG. 27. The apparent power loading of the two critical transmission lines, $S_{16-17}$ and $S_{37-43}$, are sampled at 0.1 Hz and fed into the global DSOPF controller after a linear scaling. The plant output is denoted as $y^G(k)$.

The plant has six inputs, $u^G_1(k)$ to $u^G_6(k)$, form the global DSOPF controller. Each of the six inputs is an adjustment signal to change the tie-line flow commands. These six inputs are scaled and added to the steady-state dispatches obtained from the traditional OPF algorithm.

The utility function of the global DSOPF controller has 2 components, as in $$U^G(k)=U^G_{Line}(k)+U^G_{Ctrl}(k) \qquad \text{Function (13)}$$

where $U^G_{Line}(k)$ is an index representing the line loadings of the two monitored lines and $U^G_{Ctrl}(k)$ is an index representing the control effort of the global DSOPF controller.

The DHP adaptive critic design scheme shown in FIG. 14 is then used to design the global DSOPF controller.

Control Performance of the Global DSOPF Controller

The global DSOPF controller provides the additional coordination between the local areas by adjusting their tie-line flows. To evaluate the performance of the global DSOPF controller, the 70-bus system is simulated under the same event of a large unexpected wind power rise as shown above. The system responses with the additional global DSOPF controller are compared with the results from using the AGCs+SVCs and using only the area DSOPF controllers without global coordination.

Figure 28:
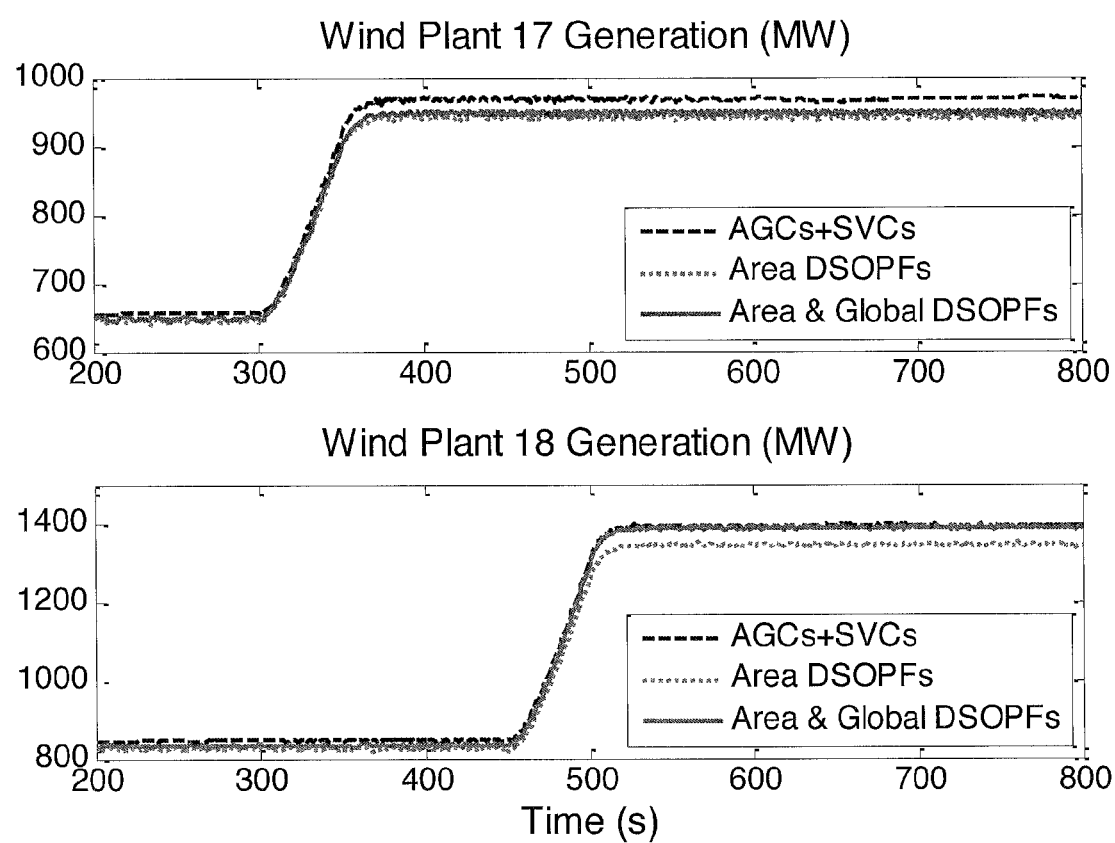
FIG. 28 is a graphical view of performance charts for a power system over time as controlled by AGC controllers and DSOPF controllers.
Figure 29:
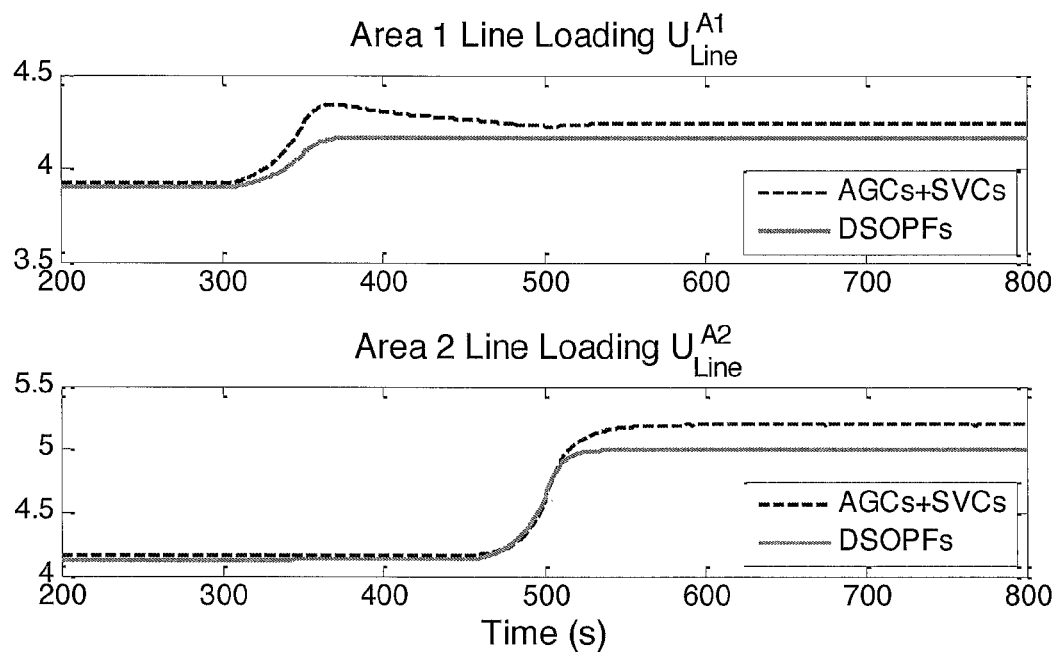
FIG. 29 is a graphical view of performance charts for a power system over time as controlled by AGC controllers and DSOPF controllers.
Figure 30:
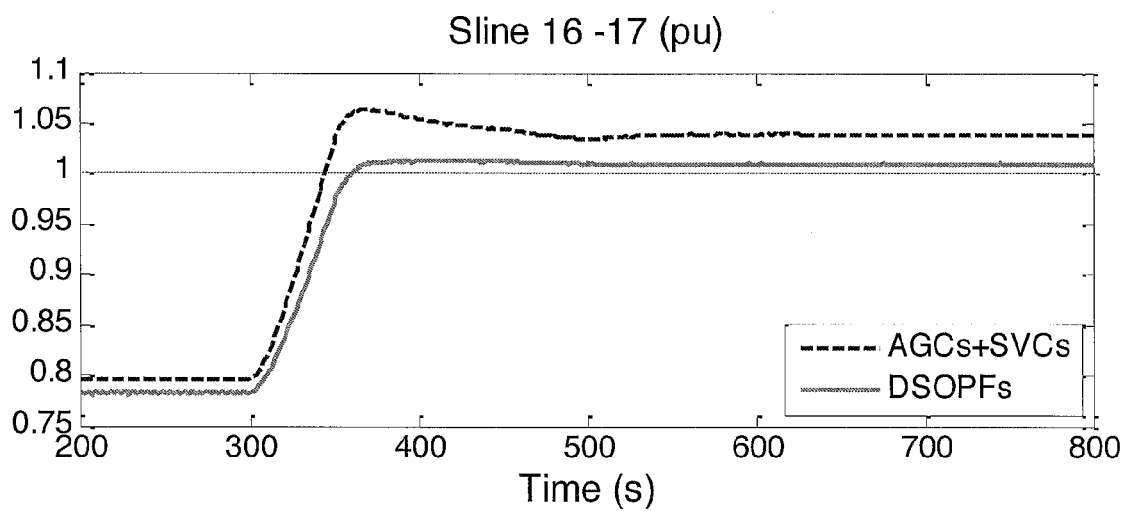
FIG. 30 is a graphical view of performance charts for a power system over time as controlled by AGC controllers and DSOPF controllers.

Compared to the case of using only the area DSOPF controllers, the global DSOPF controller reduces the wind power curtailment, as shown in FIG. 28, and at the same time further relieves the two congested line, line 16-17 and line 37-43, as shown in FIG. 29 and FIG. 30.

Figure 31:
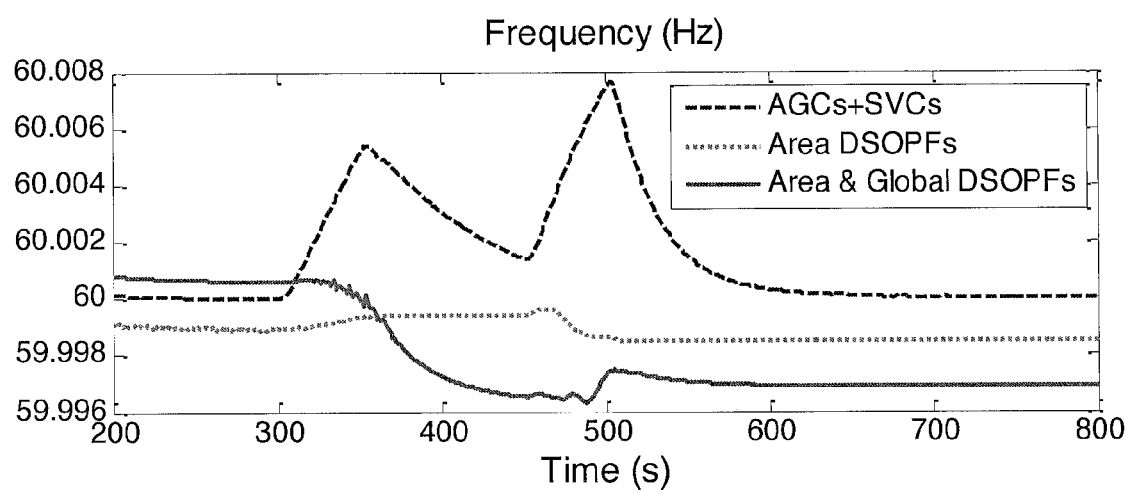
FIG. 31 is a graphical view of performance charts for a power system over time as controlled by AGC controllers and DSOPF controllers.

When the global DSOPF controller is used, the system frequency has a higher deviation than using only the area DSOPF controllers, as shown in FIG. 31. This is because the frequency response is not one of the objectives in the global DSOPF utility function, and changing the inter-area tie-line flows disturbs the power balance of each local area.

In these examples, the advantages of the invention become clear. A two-level dynamic stochastic optimal power flow (DSOPF) control scheme is described herein to scale up the DSOPF control algorithm for large power systems. Area DSOPF controllers are developed to control the dynamic AC power flow of local areas. In the presence of high wind variability and uncertainty, the area DSOPF controllers are shown to better maintain the system frequency, area voltage profile, and line loading, but at the cost of higher control effort and some wind curtailment. An additional global DSOPF controller is designed to further coordinate the area DSOPF controllers by adjusting the inter-area tie-line flows. The global coordination further relieves the congested lines and reduces wind curtailment. This two-level architecture distributes the control and computation effort, and reduces training difficulty for implementing the DSOPF control for a large network.

While preferred embodiments of the invention have been shown and described, modifications and variations may be made thereto by those skilled in the art without departing from the spirit and scope of the present invention. It should be understood, therefore, that other aspects of the invention are possible and that various aspects of the embodiments offered may be interchanged in whole or in part. Furthermore, those of ordinary skill in the art will appreciate that the foregoing description is by way of example only and is not intended to limit the invention as further described in the following claims.

The invention claimed is:

1. An electrical power system comprising:
a dynamic stochastic optimal power flow (DSOPF) control system for receiving power flow commands and controlling an amount of active and reactive power within an area controlled by said DSOPF control system;
a global scalable dynamic stochastic optimal power flow (S-DSOPF) controller configured to:
monitor one or more lines within the area;
determine global power flow commands based on the monitored lines and a global S-DSOPF model; and
communicate the global power flow commands to the DSOPF control system;
whereby said global S-DSOPF control system calculates said global S-DSOPF model representing an optimal power system state for an electrical grid based upon condition data, and controls an amount of active and reactive power in said electrical grid; and
whereby said DSOPF control system controls power flow within said area based on the global power flow commands and a DSOPF model representing an optimal power system state for said area.

2. The system of claim 1 further comprising a functional unit capable of estimating a cost-to-go function, J, as defined by the equation $$J(k) = \sum_{i=0}^{\infty} \gamma^i \cdot U(k+i),$$

wherein $\gamma$ is a discount factor with a value between 0 and 1, k is a time value, and U(k) is a utility function with a present cost to be minimized at said time value, k.

3. The system of claim 2 wherein said functional unit estimates said cost-to-go function, J, as described by a derivative of J(k) with respect to a state of the system.

4. The system of claim 2 wherein said functional unit estimates said cost-to-go function, J, as described by a combination of a scalar cost-to-go function, J(k), and a derivative of J(k) with respect to a state of the system.

5. The system of claim 2 wherein said S-DSOPF control system is adapted based on the feedbacks from one or more critic networks and one or more up-to-date model networks.

6. The system of claim 1 further comprising a multiplicity of sensors wherein said multiplicity of sensors comprise one or more of a line flow sensor, bus voltage sensor, generator rotor angle sensor, generator speed sensor, generator power output sensor, and a phasor measurement unit.

7. The system of claim 1 further comprising an active power generation controller wherein said active power generation controller comprises one of a flexible alternating current transmission system (FACTS) device and an active power set-point for an individual generation input.

8. The system of claim 1 further comprising a reactive power generation controller wherein said reactive power generation controller comprises one of a flexible alternating current transmission system (FACTS) device and an active power set-point for an individual generation input.

9. The system of claim 1 wherein one of at least a area control error, a system-wide voltage deviation, a loading of system-wide heavily loaded power lines, a curtailment of renewable energy generation, a total fuel usage and cost, a total line loss, and a control effort in said electrical grid is minimized.

10. The system of claim 1 wherein a system stability margin of said electrical grid is maximized.

11. The system of claim 1 wherein a system security margin of said electrical grid is maximized.

12. The system of claim 1 wherein said S-DSOPF control system comprises a first global DSOPF controller capable of simultaneously controlling one or more additional DSOPF controllers.

13. A system for improved scalable control of an active power flow and a reactive power flow in an electrical grid comprising:
a non-transitory computer readable medium in communication with a multiplicity of sensors connected to an electrical grid, wherein said multiplicity of sensors monitor conditions within said electrical grid and produce condition data corresponding to said conditions within said electrical grid;
a set of computer readable instructions embodied within said non-transitory computer readable medium for receiving said condition data to determine a current control state of said electrical grid, to create a global scalable dynamic stochastic optimal power flow (S-DSOPF) model representing an optimal power flow of said electrical grid in response to said condition data,
to create a dynamic stochastic optimal power flow (DSOPF) model representing an optimal power flow of said electrical grid in an area controlled based on said DSOPF model in response to said condition data, and
to implement said global S-DSOPF model by controlling said electrical grid through output of global control data based on said global S-DSOPF model transmitted to said DSOPF model, and
to implement said DSOPF model to output local control data to one or more active power generation controllers and reactive power generation controllers to control power flow within said area based on said global control data and said DSOPF model,
thereby controlling the amount of active and reactive power in said electrical grid based on the global S-DSOPF model and controlling the amount of active and reactive power in said area based on the DSOPF model.

14. A method of improving stability of an electrical grid, said method comprising the steps of:
receiving condition data from a multiplicity of sensors in communication with an electrical grid, wherein said multiplicity of sensors monitor conditions within said electrical grid and produce condition data corresponding to said conditions within said electrical grid;
inputting a portion of said condition data into a dynamic stochastic optimal power flow (DSOPF) control system, whereby said portion of said condition data is local condition data within an area controlled by said DSOPF control system;
creating a DSOPF model based upon said local condition data;
inputting said condition data into a global scalable dynamic stochastic optimal power flow (S-DSOPF) control system;
creating a global S-DSOPF model for said electrical grid based upon said condition data;
generating global control data corresponding to said global S-DSOPF model to control the active and reactive power within said electrical grid by transmitting global control data to said DSOPF control system; and
generating local control data corresponding to said DSOPF model, and in response to said global control data, to control one or more of an active power generation controller and a reactive power generation controller within said area controlled by said DSOPF control system;
whereby the amount of active and reactive power in said electrical grid is controlled.

15. The method of claim 14 further comprising the step of:
generating control data corresponding to said global S-DSOPF model to control one or more of an active power generation controller and a reactive power generation controller in communication with said electrical grid and said global S-DSOPF control system, whereby one or more of an area control error, a system-wide voltage deviation, a loading of system-wide heavily loaded power lines, a curtailment of renewable energy generation, a total fuel usage and cost, a total line loss, and a control effort in said electrical grid is minimized.

16. The method of claim 14 further comprising the step of:
generating control data corresponding to said global S-DSOPF model to control one or more of an active power generation controller and a reactive power generation controller in communication with said electrical grid and said global S-DSOPF control system, whereby a system stability margin of said electrical grid is maximized.

* * * * *

UNITED STATES PATENT AND TRADEMARK OFFICE
CERTIFICATE OF CORRECTION

PATENT NO. : 9,507,367 B2
APPLICATION NO. : 13/859242
DATED : November 29, 2016
INVENTOR(S) : Ganesh Kumar Venayagamoorthy, Jiaqi Liang and Ronald Gordon Harley It is certified that error appears in the above-identified patent and that said Letters Patent is hereby corrected as shown below:

On the Title Page

Item (57) Lines 4-5:
In the second sentence of the Abstract, strike "adaptive critic designs (ACDs)" and substitute therefore "automatic generation control (ACG)".

Signed and Sealed this
Eighth Day of May, 2018

Andrei Iancu
*Director of the United States Patent and Trademark Office*